United States Patent
Hsu et al.

(10) Patent No.: US 11,595,154 B1
(45) Date of Patent: Feb. 28, 2023

(54) INSTRUCTION-BASED MULTI-THREAD MULTI-MODE PDCCH DECODER FOR CELLULAR DATA DEVICE

(71) Applicant: Apple Inc., Cupertino, CA (US)

(72) Inventors: Steve Hengchen Hsu, San Diego, CA (US); Mohanned Omar Sinnokrot, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/448,869

(22) Filed: Sep. 24, 2021

(51) Int. Cl.
| | |
|---|---|
| H04L 1/00 | (2006.01) |
| G06F 12/10 | (2016.01) |
| G06F 9/30 | (2018.01) |
| H04W 72/04 | (2023.01) |
| H04W 84/04 | (2009.01) |

(52) U.S. Cl.
CPC ........ *H04L 1/0047* (2013.01); *G06F 9/30145* (2013.01); *G06F 12/10* (2013.01); *H04L 1/0057* (2013.01); *H04L 1/0059* (2013.01); *H04W 72/04* (2013.01); *G06F 2212/174* (2013.01); *H04W 84/042* (2013.01)

(58) Field of Classification Search
CPC ... H04L 1/0047; H04L 1/0057; H04L 1/0059; G06F 9/30145; G06F 12/10; G06F 2212/174; H04W 72/04; H04W 84/042
USPC ........................................................ 455/450
See application file for complete search history.

(56) References Cited

U.S. PATENT DOCUMENTS

| | | | |
|---|---|---|---|
| 5,101,341 A * | 3/1992 | Circello | G06F 9/382 |
| | | | 712/E9.034 |
| 5,809,320 A | 9/1998 | Jain et al. | |
| 6,163,837 A | 12/2000 | Chan et al. | |
| 2015/0100763 A1* | 4/2015 | Holm | G06F 9/30145 |
| | | | 712/210 |
| 2017/0177366 A1* | 6/2017 | Kothinti Naresh | G06F 9/381 |
| 2018/0004528 A1* | 1/2018 | Okazaki | G06F 9/3806 |
| 2018/0307980 A1* | 10/2018 | Barik | G06N 3/063 |

OTHER PUBLICATIONS

Beltrame, Giovanni, "A Model for Assembly Instruction Timing and Power Estimation on Superscalar Architectures." Politecnico di Milano, final report, version 1.4. 2002. 88 pages.
Asanović, Krste, "Vector Microprocessors," A dissertation for the degree of Doctor of Philosophy in Computer Science in the Graduate Division of the University of California, Berkeley. Srping 1998. 268 pages.

* cited by examiner

Primary Examiner — Don N Vo
(74) Attorney, Agent, or Firm — Kilpatrick Townsend & Stockton LLP

(57) ABSTRACT

A cellular modem processor can include dedicated processing engines that implement specific, complex data processing operations. To implement PDCCH decoding, a cellular modem can include a pipeline having multiple processing engines, with the processing engines including functional units that execute instructions corresponding to different stages in the PDCCH decoding process. Flow control and data synchronization between instructions can be provided using a hybrid of firmware-based flow control and hardware-based data dependency management.

20 Claims, 16 Drawing Sheets

INSTRUCTION-BASED MULTI-THREAD MULTI-MODE PDCCH DECODER FOR CELLULAR DATA DEVICE

CROSS-REFERENCES TO RELATED APPLICATIONS

This disclosure includes subject matter related to the following U.S. patent applications: U.S. patent application Ser. No. 17/448,863, filed Sep. 24, 2021, and U.S. patent application Ser. No. 17/484,982, filed Sep. 24, 2021. The disclosures of these applications are incorporated herein by reference in their entirety.

BACKGROUND

The present disclosure relates generally to cellular data processing and in particular to implementation of a physical downlink control channel (PDCCH) decoder in a cellular data device.

With the advent of high-speed cellular data communication, users of mobile devices are increasingly able to access information when and where they need it. Cellular data communication standards, promulgated by the 3rd Generation Partnership Project (3GPP), enable radio-frequency communication between a base station (typically implemented at a cellular antenna tower) and various user equipment (UE), which can be a mobile device such as a smart phone, tablet, wearable device, or the like, via an "uplink" from the UE to the base station and a "downlink" from the base station to the UE.

Standards promulgated by 3GPP include specifications for radio access networks (RANs), such as 4G Long-Term Evolution (referred to herein as "4G" or "LTE") and 5G New Radio (referred to herein as "5G" or "NR"). The 4G and 5G RAN specifications define multiple logical channels between the base station and the UE, including a physical uplink shared channel (PUSCH) and physical downlink shared channel (PDSCH) that transmit application-layer data, as well as a physical uplink control channel (PUCCH) and physical downlink control channel (PDCCH) that transmit control data used to specify various parameters associated with data transmission on the shared channels.

The specifications also define the sequence of operations used to prepare data for transmission as a radio-frequency (RF) signal on each channel. By way of example of the complexity involved, the general sequence of operations for PDSCH involves the following steps: The base station receives a transport block consisting of a sequence of data bits to be communicated to the UE. The base station adds cyclic redundancy check (CRC) bits, segments the transport block based on a maximum codeword size, adds CRC bits per-segment, encodes each segment using an encoding algorithm that adds parity bits to enable error correction, performs bit interleaving and rate matching operations that improve robustness against channel loss, and applies a scrambling algorithm. The resulting bit sequence is then mapped onto a sequence of modulation symbols that are assigned to subcarrier frequencies and time bins (typically referred to as "resource elements"). An inverse Fast Fourier Transform (IFFT) generates a digital representation of a waveform that can be converted to analog, mixed with a carrier frequency, and transmitted via an antenna (or antennal array) to the UE. The UE reverses the base-station operations to recover the data. For instance, the UE can receive the RF signal, extract a baseband signal by removing the carrier frequency, generate a digitized representation of the baseband signal, and apply a Fast Fourier Transform (FFT) to transform the signal to frequency domain. A demapper can apply a channel estimate to produce a sequence of log likelihood ratios (LLRs) representing the relative probability of each transmitted bit being either 0 or 1. The LLR sequence can be descrambled, de-interleaved and de-rate-matched, decoded, and error-corrected (based on parity and CRC bits after decoding), thereby producing output data blocks. For PUSCH, the sequence of operations is similar, with the roles of base station and UE reversed. PUCCH and PDCCH, which generally include smaller blocks of data, have their own associated sequences of operation. The particular operations and sequences may vary; for instance the shared channels for 4G and 5G use different encoding algorithms and a different order of interleaving and rate matching operations.

To manage these operations at high data rates, the UE typically includes a dedicated cellular modem. A cellular modem can be implemented as one or more integrated circuits, logically separated into a "baseband" processor and a "radio-frequency," or "RF," processor. The baseband processor handles operations such as segmentation, encoding, interleaving and rate matching, and scrambling for the uplink channels (and the reverse operations for the downlink channels), while the RF processor handles waveform generation and all analog operations.

Many types of UE are portable, battery-powered devices such as smart phones, tablets, wearable devices, and the like. For such devices, it is desirable to have a cellular modem that is area-efficient and power-efficient while supporting high data rates. In addition, to support mobility across a range of geographic areas where base stations supporting different standards may be available, it is also desirable that the same modem can support multiple cellular data communication specifications, e.g., both 4G and 5G.

SUMMARY

According to some embodiments, a cellular modem processor can include dedicated processing engines that implement specific, complex data processing operations. To implement operations such as PDCCH decoding, a cellular modem can include various pipelines of processing engines, with the processing engine including functional units that execute instructions corresponding to different steps in a sequence of operations. For instance, the functional units in a PDCCH decoding pipeline can include functional units that implement descrambling, de-rate-matching, and decoding for one or more operating modes (e.g., polar decoding for 5G and/or convolutional decoding for 4G). Flow control or data synchronization between instructions is provided using a hybrid of firmware-based flow control and hardware-based data dependency management. For instance, firmware instructions can define data flow by a sequence of instructions that provide input and output virtual addresses for operations, where the input and output virtual addresses are mapped to (physical) buffers in the pipeline such that different buffers have different virtual addresses. A hardware interlock controller within the pipeline can track and enforce the data dependencies for the pipeline based on the virtual addresses.

Some embodiments relate to a processing system that can include processing engines, buffers, a control processor, and an interlock controller. The processing engines can include functional units configured to execute an instruction having an input virtual address and an output virtual address; for instance, a first processing engine can include a first functional unit configured to execute a rate recovery instruction for a candidate data element, and a second processing engine can include two or more decoder functional units configured to execute decode instructions to decode a candidate data element, where different decoder functional units are configured to execute different decode instructions. The buffers can be coupled to the processing engines, and different buffers can be mapped to different virtual addresses in a virtual address space. The buffers can include a decoder input buffer and a decoder output buffer. The control processor can be coupled to the processing engines and can be configured to dispatch a sequence of instructions to the processing engines to decode a first candidate data element, where the sequence of instructions includes a rate recovery instruction having an output virtual address that maps to a first region in the decoder input buffer and a selected decode instruction selected from the plurality of decode instructions, the selected decode instruction having an input virtual address that maps to the first region in the decoder input buffer and an output virtual address that maps to a first region in the decoder output buffer. The interlock controller can be coupled to the processing engines and configured to manage data dependencies based on the input virtual addresses and the output virtual addresses of the instructions.

In some embodiments, the processing engines can also include a respective dispatch queue configured to queue one or more instructions; a respective dispatch queue interface configured to receive, in order, the dispatched instructions from the control processor, to queue the dispatched instructions in the dispatch queue for in-order execution, and to communicate a read-lock request for the input virtual address and a write-lock request for the output virtual address to the interlock controller; and a respective instruction interface configured to communicate with the interlock controller to determine whether data dependencies for a next instruction queued in the dispatch queue are cleared, wherein the instruction interface initiates execution of the next instruction after the interlock controller indicates that the data dependencies are cleared.

In some embodiments, the decoder functional units can include a first decoder functional unit configured to perform polar decoding of a candidate data element in response to a polar-decode instruction and a second decoder functional unit configured to perform convolutional decoding of a candidate data element in response to a convolutional-decode instruction. In some embodiments, the control processor can be configured such that when the candidate data element is from a transmission received via a 5G radio area network, the selected decode instruction is the polar-decode instruction, and when the candidate data element is from a transmission received via a 4G radio area network, the selected decode instruction is the convolutional-decode instruction.

In some embodiments, the sequence of instructions can also include a read instruction having an input virtual address that maps to the first region in the decoder output buffer and an output address that maps to a region in a register file of the control processor, and the read instruction can be dispatched subsequently to the selected decode instruction.

In some embodiments, the buffers can also include a control channel element buffer, and the processing engines can also include a third processing engine that includes a load functional unit configured to execute a load instruction having an output virtual address that maps to a location in the control channel element buffer. In some embodiments, the sequence of instructions can also include the load instruction having an output virtual address that maps to a first location in the control channel element buffer, and the rate recovery instruction in the sequence of instructions can have an input virtual address that maps to the first location in the control channel element buffer.

In some embodiments, the control processor can be configured to issue, for a number of sub-blocks corresponding to a candidate data element, the load instruction, where the output virtual address of the load instruction is a sub-block-dependent virtual address, followed by the rate recovery instruction where, for each sub-block, the input virtual address of the rate recovery instruction matches the output virtual address of the load instruction and the output virtual address of the rate recovery instruction is a de-interleaved location for the sub-block within the first region in the decoder input buffer.

In some embodiments, the control processor can be further configured such that a first instruction in the sequence of instructions is dispatched for a second candidate data element before a last instruction in the sequence of instructions for the first candidate data element is executed.

Some embodiments relate to a cellular modem processor that can have multiple processing pipelines including a first processing pipeline. The first processing pipeline can include processing engines, buffers, a control processor, and an interlock controller. The processing engines can include functional units configured to execute an instruction having an input virtual address and an output virtual address; for instance, a first processing engine can include a first functional unit configured to execute a rate recovery instruction for a candidate data element, and a second processing engine can include two or more decoder functional units configured to execute decode instructions to decode a candidate data element, where different decoder functional units are configured to execute different decode instructions. The buffers can be coupled to the processing engines, and different buffers can be mapped to different virtual addresses in a virtual address space. The buffers can include a decoder input buffer and a decoder output buffer. The control processor can be coupled to the processing engines and can be configured to dispatch a sequence of instructions to the processing engines to decode a first candidate data element, where the sequence of instructions includes a rate recovery instruction having an output virtual address that maps to a first region in the decoder input buffer and a selected decode instruction selected from the plurality of decode instructions, the selected decode instruction having an input virtual address that maps to the first region in the decoder input buffer and an output virtual address that maps to a first region in the decoder output buffer. The interlock controller can be coupled to the processing engines and configured to manage data dependencies based on the input virtual addresses and the output virtual addresses of the instructions.

In some embodiments, the first processing pipeline can be configured to decode physical downlink control channel (PDCCH) data received via a 5G radio area network and to decode PDCCH data received via a 4G radio area network. In some embodiments, a second processing pipeline can be configured to decode physical downlink shared channel (PDSCH) data received via the 5G radio area network, and a third processing pipeline can be configured to decode PDSCH data received via the 4G radio area network.

In some embodiments, the decoder functional units can include a first decoder functional unit configured to perform polar decoding of a candidate data element in response to a polar-decode instruction and a second decoder functional unit configured to perform convolutional decoding of a candidate data element in response to a convolutional-decode instruction. In some embodiments, the control processor can be configured such that when the candidate data element is from a transmission received via the 5G radio area network, the selected decode instruction is the polar-decode instruction, and when the candidate data element is from a transmission received via the 4G radio area network, the selected decode instruction is the convolutional-decode instruction.

In some embodiments, the cellular modem processor can also include a shared memory coupled to at least two of the processing pipelines, including the first processing pipeline.

Some embodiments relate to a method that can include receiving, at a cellular modem processor having a decoding pipeline and a control processor, a set of candidate data elements. The control processor can dispatch a sequence of instructions to the decoding pipeline to decode the candidate data elements, where the sequence of instructions for one of the candidate data elements can include a rate recovery instruction having an output virtual address that maps to a first region in a decoder input buffer of the decoding pipeline and a selected decode instruction selected from a set of two or more decode instructions, the selected decode instruction having an input virtual address that maps to the first region in the decoder input buffer and an output virtual address that maps to a first region in a decoder output buffer of the decoding pipeline. The dispatched instructions can be received in respective dispatch queues in a plurality of processing engines in the decoding pipeline, where the processing engine in which a particular dispatched instruction is received includes a functional unit configured to execute the particular dispatched instruction. The processing engines can send, in response to receiving an instruction, a read-lock request for the input virtual address and a write-lock request for the output virtual address to an interlock controller of the decoding pipeline. The dispatched instructions can be issued from the dispatch queues to the functional units configured to execute the instructions. Instructions in a same one of the dispatch queues can be issued in order, and a next instruction can be issued from a particular dispatch queue after the interlock controller confirms, based on the input virtual address and the output virtual address, that data dependencies for the next instruction have been cleared. The issued instructions can be executed by the functional units, and executing an issued instruction can include one or both of reading from the buffer region mapped to the input virtual address or writing to the buffer region mapped to the output virtual address.

In some embodiments, the method can also include selecting the decode instruction from the set of decode instructions based on a particular radio area network associated with the plurality of candidate data elements.

In some embodiments, the set of decode instructions includes a polar-decode instruction and a convolutional-decode instruction. When the candidate data element is from a transmission received via a 5G radio area network, the polar-decode instruction can be selected, and when the candidate data element is from a transmission received via a 4G radio area network, the convolutional-decode instruction can be selected.

In some embodiments, the method can also include dispatching a first instruction in the sequence of instructions for a second one of the candidate data elements before a last instruction in the sequence of instructions for a first one of the candidate data elements is executed.

In some embodiments, the sequence of instructions for one of the candidate data elements can also include a load instruction, where the load instruction for the candidate data element precedes the rate-recovery instruction for the candidate data element in the sequence, and a read instruction, where the read instruction for the candidate data element is subsequent to the decode instruction for the candidate data element in the sequence. The load instruction can be an instruction to read data for the candidate data element from an externally-shared memory and can have an output virtual address that corresponds to an input virtual address of the rate recovery instruction for the candidate data element. The read instruction can be an instruction to read decoded data for the candidate data element into a register file of the control processor and can have an input virtual address that corresponds to the output virtual address of the selected decode instruction for the candidate data element.

The following detailed description, together with the accompanying drawings, will provide a better understanding of the nature and advantages of the claimed subject matter.

DETAILED DESCRIPTION

The following description of exemplary embodiments is presented for the purpose of illustration and description. It is not intended to be exhaustive or to limit the claimed embodiments to the precise form described, and persons skilled in the art will appreciate that many modifications and variations are possible. The embodiments have been chosen and described in order to best explain their principles and practical applications to thereby enable others skilled in the art to best make and use various embodiments and with various modifications as are suited to the particular use contemplated.

Figure 1:
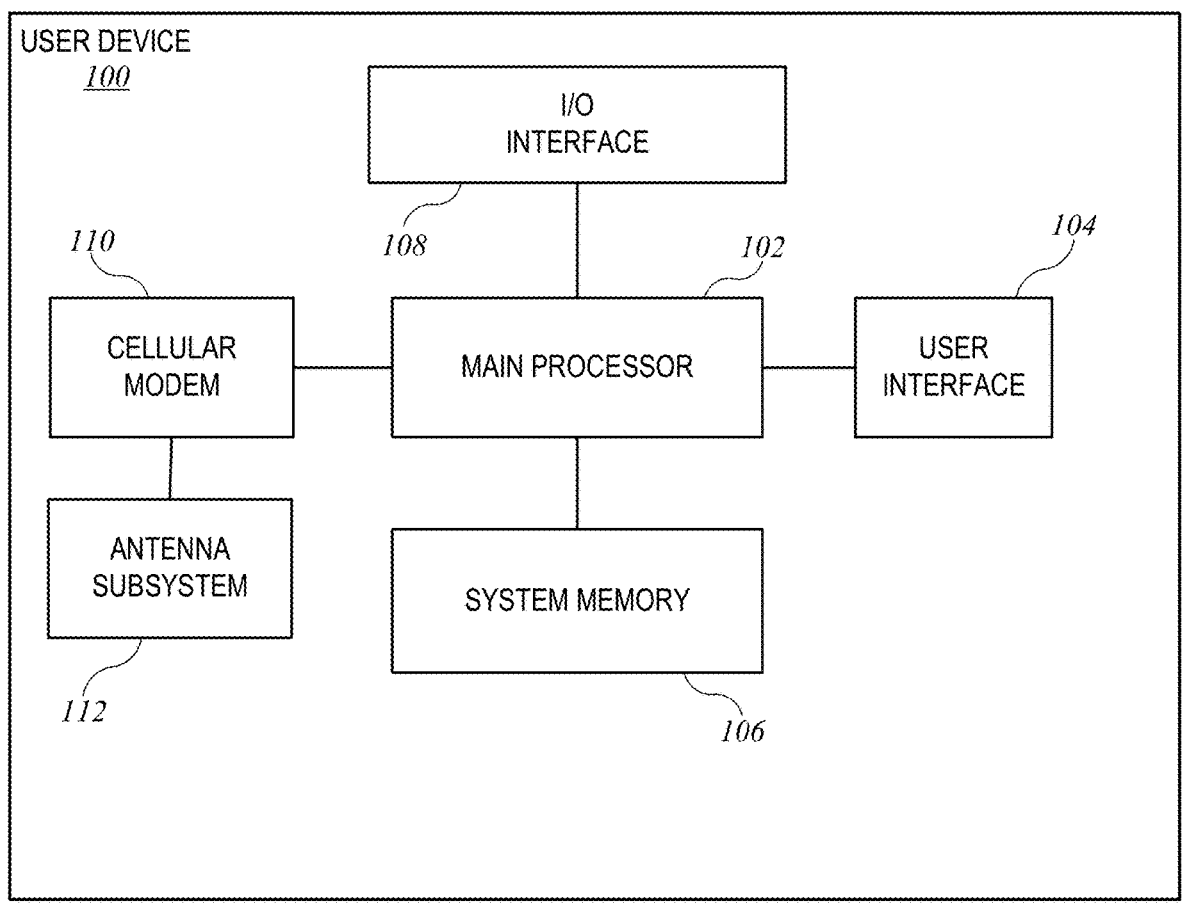
FIG. 1 is a simplified block diagram of a user device according to some embodiments.

FIG. 1 is a simplified block diagram of a user device 100 according to some embodiments. User device 100 can be, for example, a mobile device such as a smartphone, tablet computer, laptop computer, wearable device, or any other electronic device capable of operating as user equipment (UE) in a cellular radio access network. User device 100 is representative of a broad class of user-operable devices that may incorporate a cellular modem as described herein, and such devices can vary widely in capability, complexity, and form factor.

Main processor 102 can include, e.g., one or more single-core or multi-core microprocessors and/or microcontrollers executing program code to perform various functions associated with user device 100. For example, main processor 102 can execute an operating system and one or more application programs compatible with the operating system. In some instances, the program code may include instructions to send information to and/or receive information from other devices or systems, e.g., via a cellular data network such as a 4G or 5G network.

User interface 104 can include user-operable input components such as a touch pad, touch screen, scroll wheel, click wheel, dial, button, switch, keypad, keyboard, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular user device 100, a user can operate input components of user interface 104 to invoke functionality of user device 100 and/or receive output from user device 100 via output components of user interface 104. In some embodiments, user device 100 may have a limited user interface (e.g., a small number of indicator lights and/or buttons) or no user interface.

System memory 106 can incorporate any type and combination of data storage media, including but not limited to random-access memory (e.g., DRAM, SRAM), flash memory, magnetic disk, optical storage media, or any other non-transitory storage medium, or a combination of media, and can include volatile and/or non-volatile media. System memory 106 can be used to store program code to be executed by main processor 102 and any other data or instructions that may be generated and/or used in the operation of user device 100.

Input/output (I/O) interface 108 can include hardware components and supporting software configured to allow user device 100 to communicate with other devices via point-to-point or local area network links. In some embodiments, I/O interface 108 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 108 can support a wired connection to another device.

To enable communication via cellular networks, including cellular data communication, user device 100 can include a cellular modem 110 coupled to an antenna subsystem 112. Cellular modem 110 can be implemented as a microprocessor or microcontroller that acts as a co-processor to main processor 102. In some embodiments, cellular modem 110 and main processor 102 can be implemented as integrated circuits fabricated on a common substrate, e.g., as part of a system-on-a-chip design. Example implementations of cellular modem 110 are described below.

Antenna subsystem 112 can include an antenna, which can be implemented using a wire, metal traces, or any other structure capable of radiating radio-frequency (RF) electromagnetic fields and responding to RF electromagnetic fields at frequencies used in cellular data communication. For instance, 4G and 5G networks currently use various spectrum bands, including bands at 700 MHz, 850 MHz, 900 MHz, 1.5 GHz, 1.8 GHz, 2.1 GHz, 2.5 GHz and 3.5 GHz. Antenna subsystem 112 can also include circuitry to drive the antenna and circuitry to generate digital signals in response to received RF signals. A particular antenna implementation is not critical to understanding the present disclosure, and those skilled in the art will know of numerous implementations. In some embodiments, antenna subsystem 112 can be shared between cellular modem 110 and I/O interface 108; for instance, the same antenna can be used to support any combination of cellular, Wi-Fi, and/or Bluetooth communications.

User device 100 can also include other components not shown in FIG. 1. For example, in various embodiments, user device 100 can include one or more data storage devices using fixed or removable storage media; a global positioning system (GPS) and/or other global navigation satellite system (GNSS) receiver; a camera; a microphone; a speaker; a power supply (e.g., a battery); power management circuitry; any number of environmental sensors (e.g., temperature sensor, pressure sensor, accelerometer, chemical sensor, optical sensor, etc.); and so on. Accordingly, user device 100 can provide a variety of functions, some or all of which may be enhanced by or reliant on cellular data communication supported by cellular modem 110.

Figure 2:
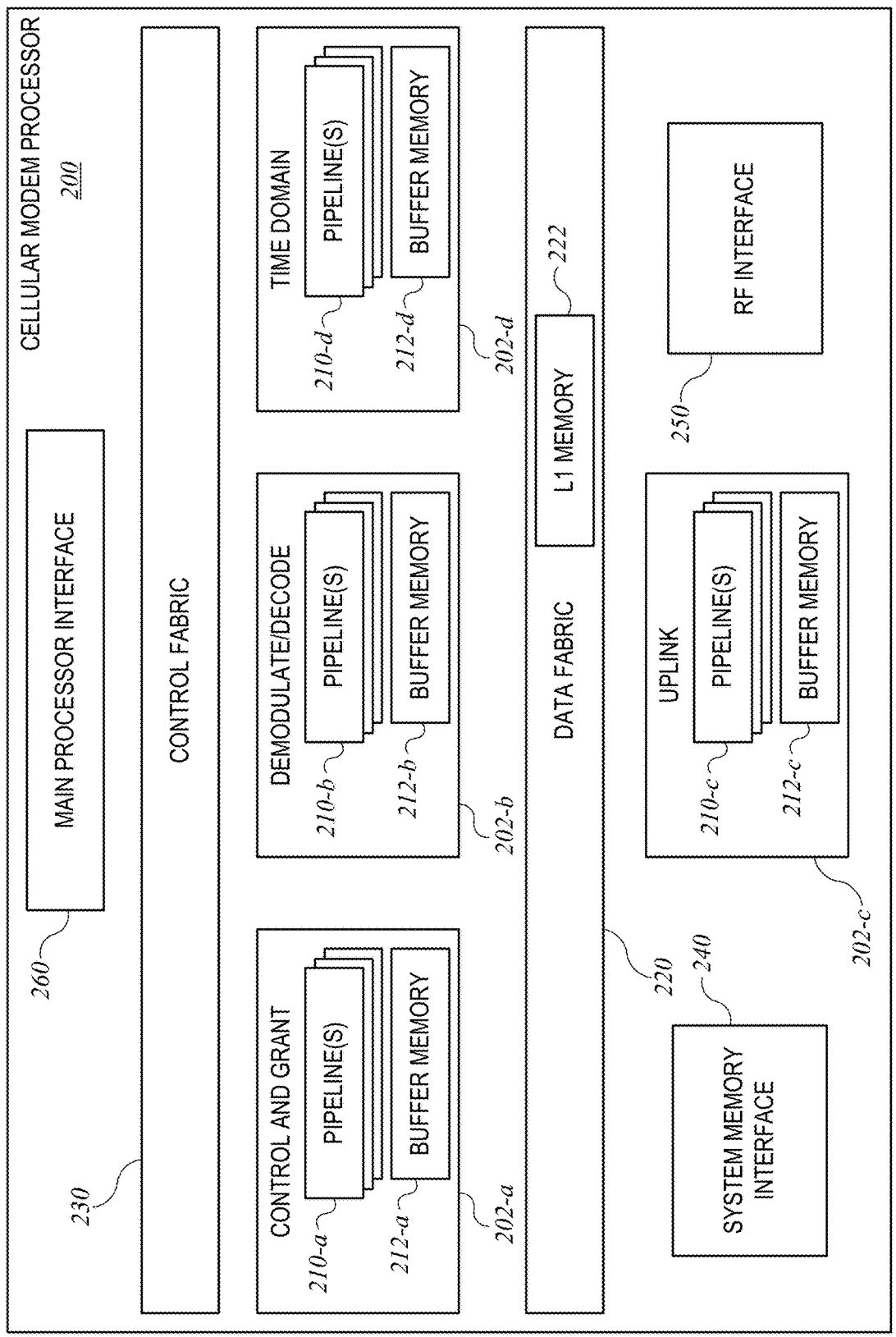
FIG. 2 is a simplified block diagram of a cellular modem processor according to some embodiments.

FIG. 2 is a simplified block diagram of a cellular modem processor 200 according to some embodiments. Cellular modem processor 200 can implement all or part of cellular modem 110 of FIG. 1. In various embodiments, cellular modem processor 200 can operate as user equipment (UE) in a cellular radio access network such as a 4G network and/or a 5G network.

Signal processing capabilities of cellular modem processor 200 can be implemented in various processing clusters 202. Each processing cluster 202 can include one or more pipelines 210 and dedicated buffer memory 212 (e.g., SRAM). Portions of buffer memory 212 can be allocated to each pipeline 210 with the processing cluster 202, so that different pipelines 210 need not share buffers. Each pipeline 210 can implement a particular sequence of operations associated with cellular data communication. For example, control and grant cluster 202-*a* can implement one or more pipelines 210-*a* for physical downlink control channel (PDCCH) processing for 4G and/or 5G networks. Information extracted from the control channel can be provided to other clusters, e.g., via data fabric 220. Demodulate/Decode (DMDC) cluster 202-*b* can implement one or more pipelines 210-*b* for physical downlink shared channel (PDSCH) processing for 4G and/or 5G networks. Uplink cluster 202-*c* can implement one or more pipelines 210-*c* for physical uplink control channel (PUCCH) processing and physical uplink shared channel (PUSCH) processing for 4G and/or 5G networks. Pipelines in control and grant cluster 202-*a*, DMDC cluster 202-*b*, and uplink cluster 202-*c* can operate in the frequency domain. Time domain cluster 202-*d* can implement one or more pipelines 210-*d* for conversion between time domain and frequency domain, which can include Fourier transforms and inverse Fourier transforms (e.g., using Fast Fourier Transform (FFT) or other discrete Fourier transform (DFT) algorithms).

Each pipeline 210 includes dedicated logic circuitry that implements a specific sequence of operations. The operations can conform to the specifications of a particular cellular data network, including 4G and/or 5G networks. For example, a PDSCH pipeline 210-b in DMDC cluster 202-b can implement frequency-domain signal processing operations for a 4G PDSCH channel, including orthogonal frequency division multiplexing (OFDM) symbol demapping, descrambling, de-interleaving, rate recovery, decoding using a Turbo decoder, and error detection and correction. Similarly, a separate PDSCH pipeline 210-b in DMDC cluster 202-b can implement frequency-domain signal processing operations for a 5G PDSCH channel, including descrambling, de-interleaving and rate recovery, decoding using a low-density parity check (LDPC) decoder, and error detection and correction. In some embodiments, at least one of PDSCH pipelines 210-b can be a configurable pipeline that handles both 4G and 5G PDSCH decoding. As another example, a PUCCH pipeline 210-c in uplink cluster 202-c can implement frequency-domain uplink processing for 4G PUCCH and PUSCH channels, including multiplexing of PUCCH and PUSCH data blocks. For example, a first pipeline can perform PUSCH encoding operations, including CRC (cyclic redundancy check) calculation, Turbo encoding, interleaving of encoded subblocks, and rate matching, while a second pipeline can perform PUCCH encoding operations, including CRC calculation, convolutional encoding, interleaving of encoded subblocks, and rate matching. A downstream pipeline can receive the rate-matched outputs of the first and second pipelines and multiplex the data into a single data stream for transmission, then scramble the data. The output can be mapped to a sequence of OFDM symbols for transmission. As these examples illustrate, each pipeline 210 can implement complex operations, and different pipelines 210 can implement disparate operations. In some instances, a cluster 202 can include multiple copies of the same pipeline 210, which can operate in parallel on different portions of a data stream to support higher throughput. Additionally or instead, a cluster 202 can include multiple different pipelines 210. For instance, in some embodiments, DMDC cluster 202-b can have one pipeline dedicated to 4G PDSCH processing and two copies of a shared pipeline that can be reconfigured for 4G or 5G PDSCH processing. Additional examples of pipelines and signal processing operations are described below.

As noted above, each pipeline 210 can have its own buffers 212 to store data as it progresses through the pipeline. To facilitate sharing of data between different pipelines 210 and different clusters 202, a data fabric 200 including a memory 222 local to cellular modem processor (referred to as "L1 memory") can be provided. Data fabric 200 can include memory circuits (e.g., SRAM, DRAM, or the like) implementing L1 memory 222, a read interface and a write interface connected via crossbars to clusters 202, and arbitration logic to manage multiple requests (e.g., using time division multiplexing or other techniques). In some embodiments, data fabric 200 can be implemented such that any cluster 202 can access any location in L1 memory 222. A particular memory or data fabric architecture is not critical to understanding the present disclosure, and a variety of architectures, including conventional architectures, can be used. In some embodiments, L1 memory 222 can be used to transfer data into and out of pipelines 210. For example, as described below, each pipeline 210 can include a first stage (or processing engine) that reads input data from L1 memory 222 and a final stage (or processing engine) that writes output data to L1 memory 222.

Control fabric 230 can include circuitry implementing communication between clusters 202 and/or between cellular modem processor 200 and other components of a device or system (e.g., user device 100 of FIG. 1) in which cellular modem processor 200 operates. For example, control fabric 230 can support messages from uplink cluster 202-c to time domain cluster 202-d indicating when uplink data is ready for conversion to time domain and transmission, messages from time domain cluster 202-d to DMDC cluster 202-b and/or control and grant cluster 202-a indicating when downlink data has been received and is ready for decoding. Any other messages or control signals to coordinate operations across different clusters or other components can be supported via control fabric 230. A particular control architecture is not critical to understanding the present disclosure, and a variety of architectures, including conventional architectures, can be used.

Cellular modem processor 200 can also include interfaces to other components of a system (e.g., user device 100 of FIG. 1) within which cellular modem processor 200 operates. For instance, a system memory interface 240 can provide a direct memory access (DMA) interface to transfer data between L1 memory 222 and system memory 106 of FIG. 1, including data for transmission via PUSCH and data received via PDSCH. RF interface 250 can transfer data to and from antenna subsystem 112 (e.g., as a digital data stream that is converted to or from an analog waveform by antenna subsystem 112). Main processor interface 260 can communicate with main processor 102, via an interface such as Advanced eXtensible Interface (AXI), which is part of ARM Advanced Microcontroller Bus Architecture or any other suitable interface for communication between a main processor and a coprocessor. System memory interface 240, RF interface 250, and main processor interface 260 can be coupled via control fabric 230 to other elements within cellular modem processor 200.

It will be appreciated that cellular modem processor 200 is illustrative and that variations and modifications are possible. A cellular modem processor can include any number and combination of clusters and pipelines, supporting any number and combination of cellular data communication standards. Data and control fabrics can be varied as desired. In some embodiments, cellular modem processor 200 can have a high throughput to support high-speed cellular networks (e.g., 12 Gbps for a 5G network).

To provide high throughput, a cellular modem processor can include a number of pipelines, where each pipeline can include a number of dedicated circuits configured to perform specific operations associated with data communication; examples include encoding, decoding, interleaving, rate matching, de-interleaving, de-rate-matching, computing cyclic redundancy check (CRC) bits, performing CRC, and so on. In some embodiments, some or all of the pipelines can be implemented using a general architectural framework that provides flexible (firmware-based) control with a data synchronization mechanism that is independent of the particular functionality of a pipeline or pipeline stage.

Figure 3:
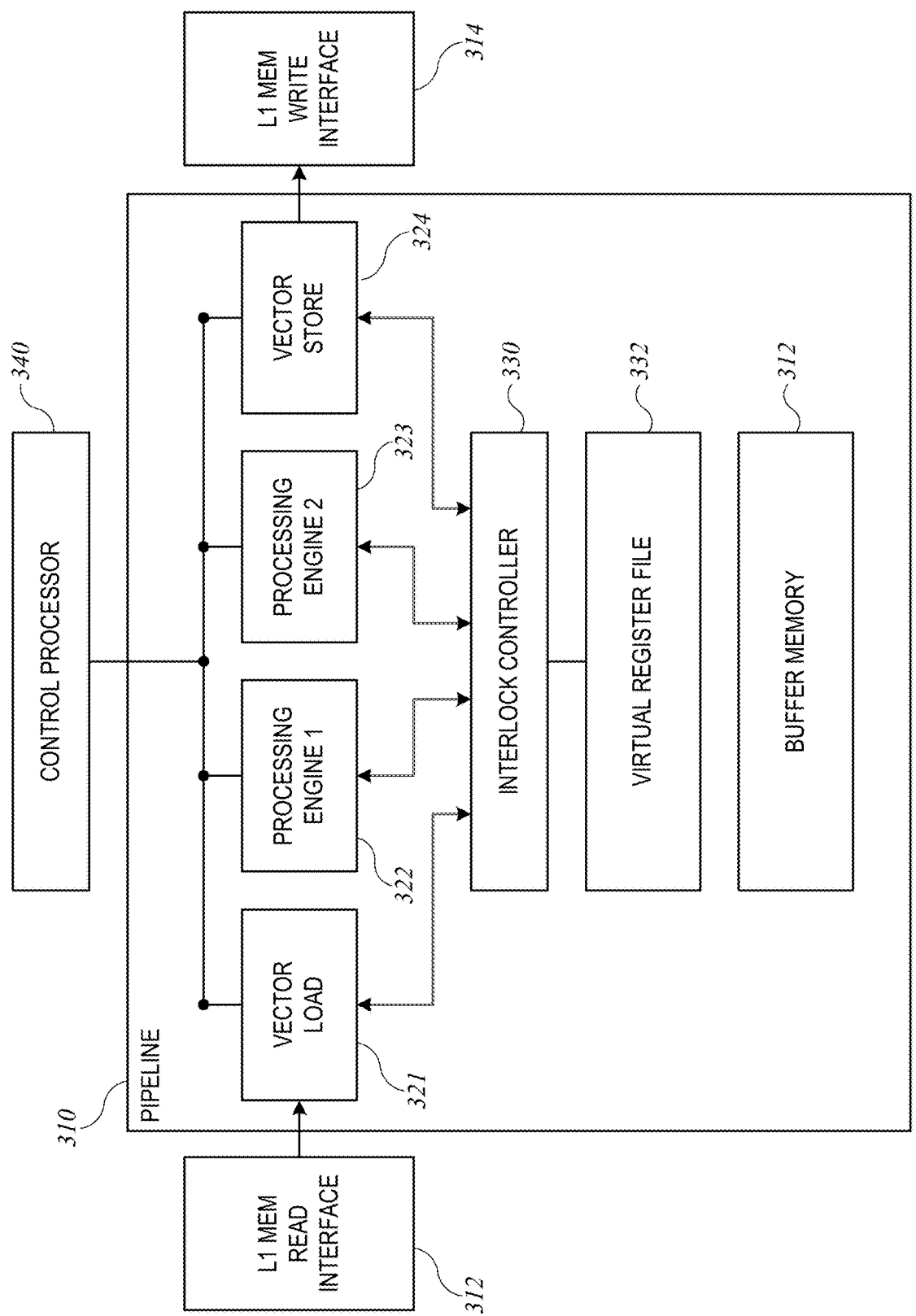
FIG. 3 shows a simplified block diagram of an architecture for a pipeline for a processor according to some embodiments.

FIG. 3 shows a simplified block diagram of an architecture for a pipeline 310 for a processor such as cellular modem processor 200 according to some embodiments. Pipeline 310 is presented as a generalized architectural model that can be used to provide data synchronization (or flow control) in a variety of signal processing or other data processing pipelines, including any or all of the pipelines 210 in cellular modem processor 200. In some embodiments, pipeline 310 can be a vector pipeline that can execute single-instruction multiple-data (SIMD) instructions to increase parallelism. Pipeline 310 includes a number of processing engines. In this example, the processing engines include vector load engine 321, two intermediate processing engines 322, 323, and a vector store engine 324. Vector load engine 321 communicates with a read interface 312 to read data stored in L1 memory (e.g., L1 memory 222 shown in FIG. 2) into a buffer memory 312 that is local to pipeline 310. In some embodiments, vector load engine 321 may also perform other operations on data read from L1 memory. For example, where pipeline 310 implements a PDSCH processing pipeline, vector load engine 321 may perform descrambling of data read from L1 memory prior to writing the data to buffer memory 312. Intermediate processing engine 322 can perform further operations on the data written to buffer memory 312 by vector load engine 321 and can write back the results of such operations to buffer memory 312. Similarly, intermediate processing engine 323 can perform further operations on the data written to buffer memory 312 by intermediate processing engine 322 and can write back the results of such operations to buffer memory 312. Although two intermediate processing engines are shown, it should be understood that any number of intermediate processing engines can be included in a pipeline. Vector store engine 324 can communicate with a write interface 314 to L1 memory (e.g., L1 memory 222 shown in FIG. 2). For example, vector store engine 324 can read the data written to buffer memory 312 by intermediate processing engine 323 (the last intermediate processing engine) and write the data to L1 memory. In some embodiments, vector store engine 324 may also perform other operations on data read from buffer memory 312 prior to writing the data to L1 memory. Each processing engine 321-324 can include logic circuits implementing specific functions related to cellular data processing. For example, in a PDSCH pipeline, the processing engines can include processing engines that perform descrambling, deinterleaving and rate recovery, decoding, and error detection and correction.

Processing engines 321-324 can operate as stages of a pipeline, with later stages operating on the output of earlier stages. Due to data dependencies between stages, processing engines 321-324 generally do not operate on the same data set at the same time. However, pipeline 310 can be operated as a multithreaded pipeline, in which different processing engines operate concurrently on different, independent data sets. For example, intermediate processing engine 322 can operate on a first data set while vector load engine 321 is loading a second data set. A thread can be defined corresponding to each data set. Each thread can have an associated context. For instance, for LDPC encoding, different threads can use different base graphs, code block sizes, etc. Each of processing engines 321-324 can include parameter registers that store parameter values defining the current context for that processing engine; when threads are switched, new parameter values can be loaded into the parameter registers.

Each processing engine 321-324 can implement a complex operation (e.g., LDPC decoding) that may take many clock cycles to complete. Operations implemented in different processing engines in the same pipeline may take different amounts of time to complete, and in some instances, an operation may take a variable amount of time, e.g., depending on parameter values of thread. Accordingly, pipeline 310 can benefit from data synchronization (or flow control) between processing engines 321-324 to ensure that data for a particular operation is written to buffer 312 by an upstream processing engine before a downstream processing engine attempts to read it.

According to some embodiments, data synchronization in a pipeline such as pipeline 310 can be provided using a combination of firmware-based control and a hardware-based interlock mechanism that can be independent of the particular operations implemented in the pipeline. For example, pipeline 310 can be controlled by a control processor 340. Control processor 340 can be, e.g., a scalar or superscalar microprocessor that implements an instruction set architecture (ISA) such as the x86 ISA originally developed by Intel and the related x86-64 ISA developed by AMD and Intel, ARM and AArch64 ISA from ARM Holdings, Power ISA and PowerPC ISA from IBM/Motorola, RISC-V or other ISA, including a customized ISA. Accordingly, control processor 340 can include conventional microprocessor components, such as an instruction memory and associated circuitry to fetch and decode instructions and to dispatch instructions to processing engines or functional units for execution. In some embodiments, control processor 340 can include functional units such as a general-purpose ALU, to which some instructions (e.g., add, compare, etc.) can be dispatched.

The ISA supported by control processor 340 can define a subset of instructions that control processor 340 dispatches to pipeline 310, e.g., to specific processing engines 321-324 of pipeline 310. For example, a specific instruction can be defined that is dispatched for execution by one of processing engines 321-324 in pipeline 310 for the purpose of performing an encoding process, such as LDPC encoding. The instructions dispatched to pipeline 310 can be vector (SIMD) instructions, regardless of whether control processor 340 is a vector processor. In some instances, the instructions dispatched to the pipeline can include context (thread-specific) parameters, such as address range(s) within buffer 312 for reading and/or writing data, as well as other parameters specifying aspects of the operation to be performed (e.g., rate-matching parameters, code block sizes for encoding or decoding, and so on). In addition or instead, the ISA can define parameter-setting instructions that provide some or all of the context parameters for a thread to pipeline 310.

Program code to be executed by control processor 340 can be provided as firmware. For instance, an instruction storage memory of control processor 340 can be loaded with code during installation or upgrading of a user device (e.g., user device 100), and control processor 340 can execute the firmware code.

The order of instructions in the program code can (implicitly) define data dependencies. For instance, if an instruction to write to a particular memory location in buffer memory 312 precedes an instruction to read from that location, a read-after-write dependency is defined. If an instruction to read from a particular memory location in buffer memory 312 precedes an instruction to write to that location, a write-after-read dependency is defined. If two different instructions specify writing to the same location in buffer memory 312, a write-after-write dependency is defined. If instructions having data dependencies are not executed in order relative to each other, the wrong data may be read, resulting in incorrect output data. In some embodiments, control processor 340 issues all instructions in-order, which can facilitate identifying data dependencies within pipeline 310. In some instances, a data dependency can exist between instructions to different processing engines 321-324. For instance, within a thread, processing engine 323 may operate on output data from processing engine 322, which involves a read-after-write dependency. Where data dependencies between processing engines exist, the later processing engine (e.g., processing engine 323) should wait to begin reading its input data until the earlier processing engine (e.g., processing engine 322) has finished writing its output data.

To manage data dependencies between processing engines 321-324, pipeline 310 can include an interlock controller 330. Interlock controller 330 can be a special-purpose logic circuit and can have associated memory that implements a virtual register file 332. For example, virtual register file 332 can be implemented using a lookup table or other addressable memory structure. (It should be understood that, as used herein, the term "virtual register file" refers to a physical memory structure. As described below, the physical memory structure can be used to store data dependency information based on references to virtual addresses.) As described below interlock controller 330 can use virtual register file 332 to track data dependencies and determine when data dependencies are cleared such that a particular processing engine can execute a particular instruction. For example, upon receipt of a dispatched instruction from control processor 340, any of processing engines 321-324 can send a read-lock request specifying an input address range (which can be defined in a virtual address space) and/or a write-lock request specifying an output address range (which can be defined in the same virtual address space) to interlock controller 330. Interlock controller 330 can update virtual register file 332 to establish the read-lock and write-lock on the specified addresses, e.g., by adding a read-lock or write-lock indicator to a list of locks associated with that address. Upon completion of an instruction (or a read or write operation associated with the instruction), the processing engine can send a clear-lock request specifying which read-lock or write-lock is to be cleared, and interlock controller 330 can update virtual register file 332 to clear the read-lock or write-lock. Prior to executing an instruction, processing engines 321-324 can poll interlock controller 330 using the relevant virtual addresses, and interlock controller 330 can respond with a "grant" signal if the polled virtual address is clear of data dependencies and a "deny" signal if not. Processing engines 321-324 can wait to execute the instruction (while continuing to poll interlock controller 330) until the grant signal is received from interlock controller 330. Accordingly, interlock controller 330 can provide data synchronization between processing engines 321-324 in pipeline 310.

It should be noted that operation of interlock controller 330 can be independent of the particular operations performed by any of the processing engines or how long a given operation might take. As long as each processing engine provides read-lock and write-lock requests on receipt of an instruction and defers execution until the grant signal is received, interlock controller 330 can manage the data dependencies.

Figure 4:
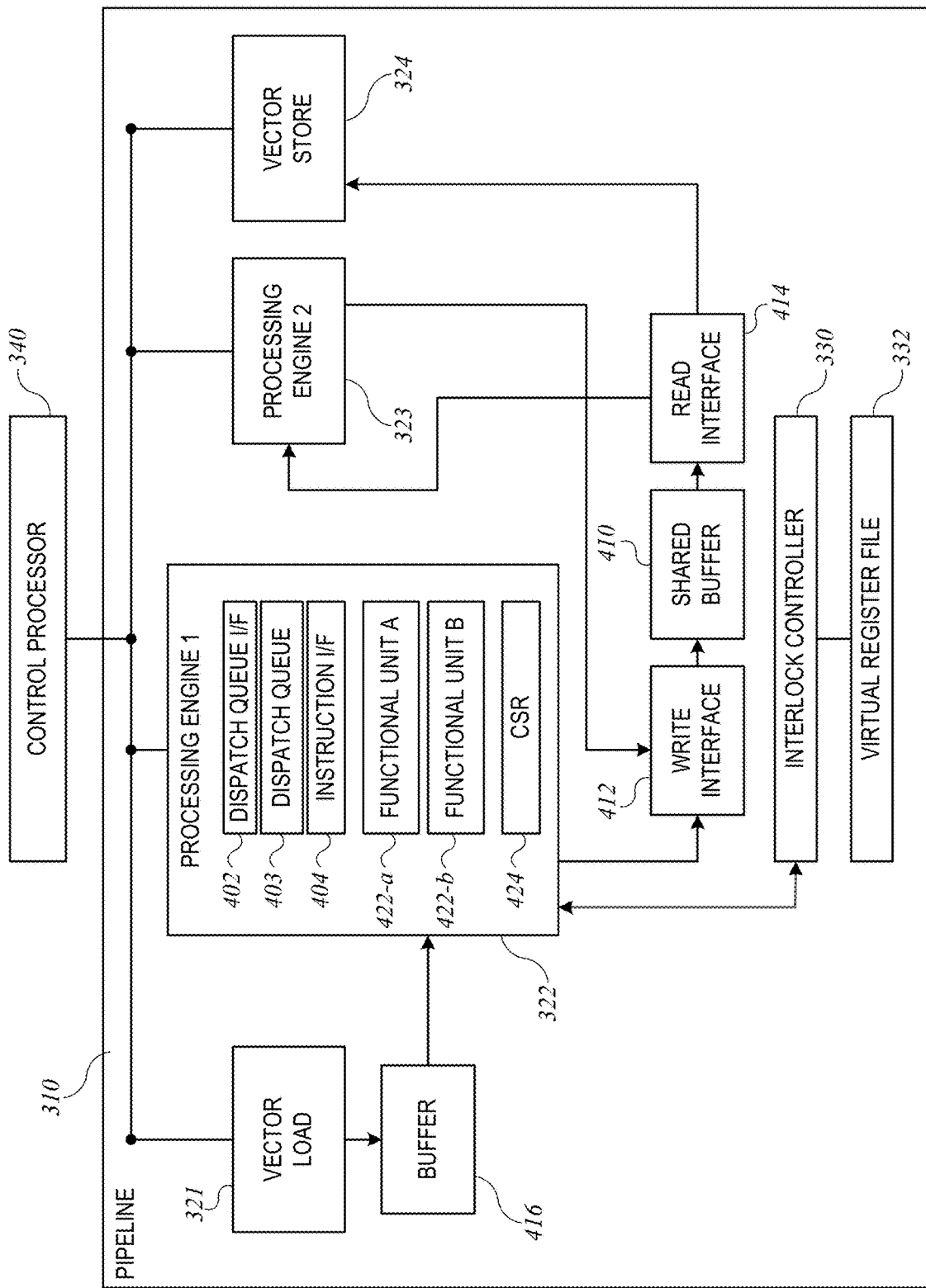
FIG. 4 shows a more detailed block diagram of the pipeline of FIG. 3 according to some embodiments.

In some embodiments, each processing engine 321-324 can use a uniform interface to communicate with control processor 340 and interlock controller 330. FIG. 4 shows a more detailed block diagram of pipeline 310 according to some embodiments. As described above, pipeline 310 includes a set of processing engines including vector load engine 321, intermediate processing engines 322-323, and vector store engine 324. Also shown in FIG. 4 are components of a representative processing engine 322. (It should be understood that other processing engines can include similar components.) Processing engine 322 can include a dispatch queue interface 402, a dispatch queue 403, an instruction interface 404, and one or more functional units 422 (two functional units 422-a and 422-b are shown; in general, a processing engine can have one or more functional units). Each functional unit 422 can be implemented as a vector (SIMD) functional unit that includes dedicated logic circuitry configured to execute an instruction (or operation) on multiple inputs in parallel. The instruction can be of arbitrary complexity. For example, a PDSCH processing pipeline that supports both 4G and 5G networks can include an instance of processing engine 322 that performs decoding. In this case, functional unit 422-a can implement Turbo decoding for 4G networks while functional unit 422-b implements LDPC decoding for 5G networks. Whether Turbo decoding or LDPC decoding is performed for a particular block of data can be determined by the instructions from control processor 340. For example, there can be a specific instruction that invokes functional unit 422-a and a different specific instruction that invokes functional unit 422-b. Each functional unit 422 can also include registers to store data during instruction execution and/or parameters that control the instruction execution. It should be understood that each functional unit 422 is a distinct physical circuit; different functional units 422 do not share components. Similarly, each processing engine 321-324 is a distinct physical circuit.

It should be understood that pipeline 310 and/or components thereof (e.g., processing engines 322) can include additional components. For example, processing engine 322 (or any processing engine in pipeline 310) can include control and status registers (CSRs) 424 that store information about received and/or executed instructions, data registers, and/or other internal registers that are not shared with other processing engines. In some embodiments, CSRs and/or other internal registers of a processing engine can be read or written by control processor 340. For example, control processor 340 can dispatch an instruction to a processing engine to read from or write to a particular CSR. In some embodiments, both blocking reads and non-blocking reads are supported. Register-read and register-write instructions can be queued in dispatch queue 403 by dispatch queue interface 402 and executed in order with other instructions to the same processing engine. In some embodiments, the internal registers of a processing engine (e.g., processing engine 322) are not shared between processing engines, and when a register-read or register-write instruction reaches the front of dispatch queue 403, it can be executed without polling interlock controller 330. In some embodiments, execution of the register-access instruction may wait until execution of any preceding instructions has completed. Vector status registers and vector flag registers can be implemented in a similar manner. Those skilled in the art with access to the present disclosure will be able to provide an appropriate set of status registers and/or flag registers and associated logic circuits to support execution of instructions using pipeline 310 and control processor 340. In various embodiments, any register that is shared between two or more processing engines can have a virtual address that allows interlock controller 330 to manage data dependencies for that register, while any register that is used by only one processing engine might or might not have a virtual address, depending on implementation.

As described above with reference to FIG. 3, data can be communicated between processing engines 321-324 using buffers 312 that are local to pipeline 310. In some instances, a buffer may be dedicated to a pair of successive processing engines in the pipeline. For example, FIG. 4 shows a dedicated buffer 416 to which vector load engine 321 writes data and from which intermediate processing engine 322 reads data. In other instances, a buffer may be shared by more than two processing engines in the pipeline. For example, FIG. 4 shows a shared buffer 410 having a write interface 412 and a read interface 414. Intermediate processing engines 322 and 323 each write data to shared buffer 410, and intermediate processing engine 323 and vector store engine 324 each read data from shared buffer 410. Write interface 412 and read interface 414 can implement crossbars and arbitration schemes such that any processing engine 321-324 (or any subset of processing engines 321-324) in pipeline 310 can read to or write from any location in shared buffer 410. Within a particular pipeline 310, any combination of shared buffers 410 and dedicated buffers 416 can be used, and within a given cellular modem processor (e.g., processor 200), different pipelines can have different configurations of buffers. A pipeline address space can be defined within each pipeline such that each location in buffers 416 and 410 (and/or any other buffers present in the pipeline) has a unique address. In some embodiments the pipeline address space can be a virtual address space that translates, or maps, to physical locations in buffers 416, 410 via a simple operation (e.g., the virtual address can be a physical address with a buffer identifier prepended or the virtual address can be identical to the physical address); a variety of mappings between virtual and physical addresses can be used, provided that each virtual address maps to a different physical location in the buffer(s) of the pipeline. In some embodiments, the virtual address space can also include virtual addresses representing other locations in addition to buffers in the pipeline. For example, virtual addresses in the virtual address space can be defined for locations in L1 memory (or any shared memory) and/or for internal registers within a processing engine (e.g., any or all of processing engines 322) such as CSRs 424, internal data registers, or any other register or data storage location in pipeline 310.

Operation of functional units 422 can be controlled by dispatch queue interface 402, dispatch queue 403, and instruction interface 404. Dispatch queue interface 402 can receive instructions dispatched from control processor 340 for execution by processing engine 322. Dispatch queue 403 can be a memory structure, such as a FIFO buffer, that can maintain a queue of instructions received from control processor 340 until they can be executed (in order) by functional units 422. The depth of dispatch queue 403 is a matter of design choice, and in various embodiments, dispatch queue 403 can hold one, two, or more instructions. Dispatch queue interface 402 can also include circuitry to add instructions to dispatch queue 403 and additional circuitry to communicate with interlock controller 330 to send read-lock and write-lock requests as new instructions are received by dispatch queue interface 402. Instruction interface 404 can include circuitry to read the oldest instruction in dispatch queue 403, communicate with interlock controller 330 (e.g., by polling) to determine when data dependencies for the oldest instruction in dispatch queue 403 are satisfied, and launch the instruction in the appropriate functional unit 422 when data dependencies are satisfied. Examples of operation of dispatch queue interface 402 and instruction interface 404 are described below.

Figure 5:
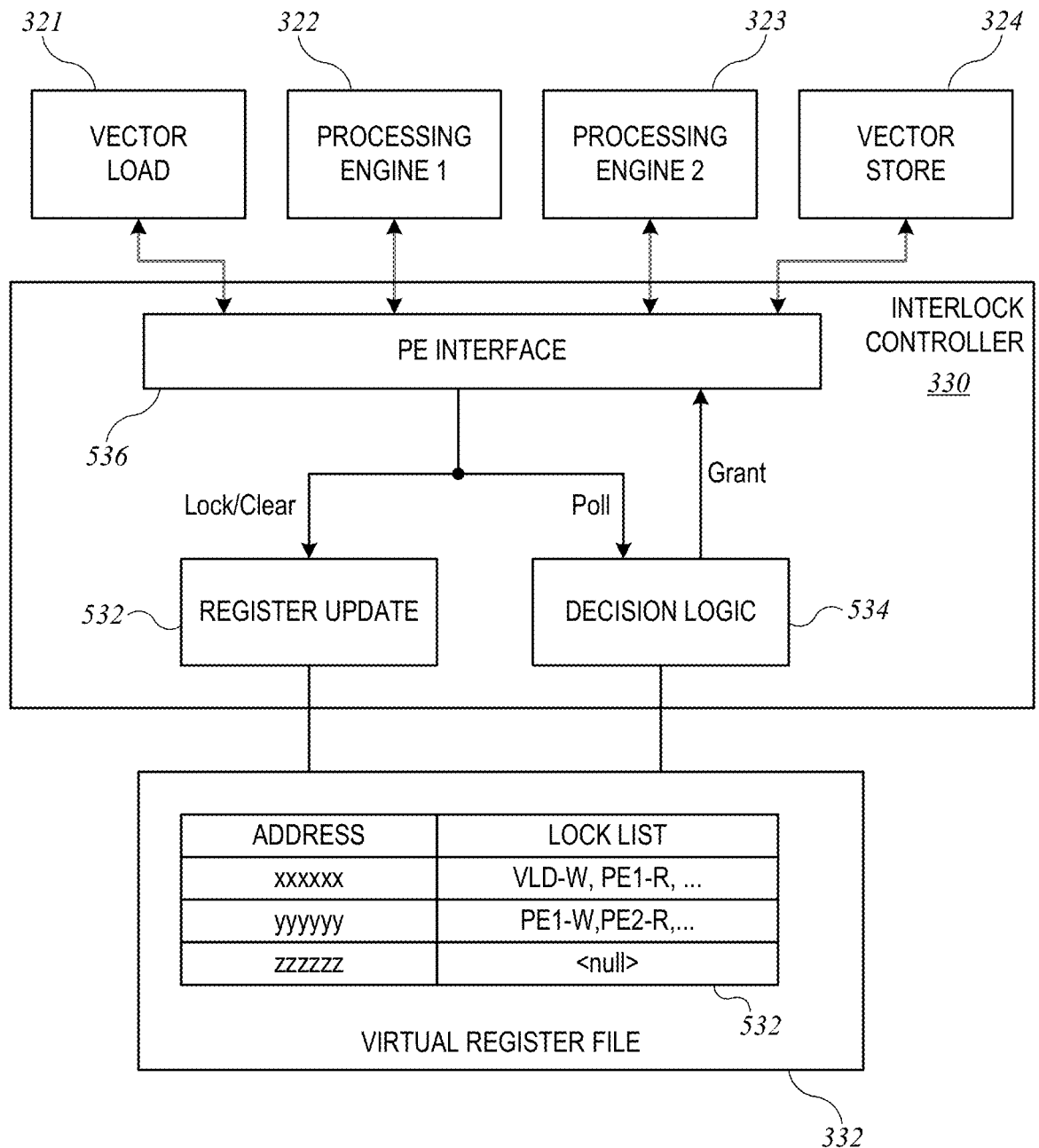
FIG. 5 is a simplified block diagram showing additional details of an interlock controller for a pipeline according to some embodiments.

Interlock controller 330 can receive and respond to requests from processing engines 321-324. FIG. 5 is a simplified block diagram showing additional details of interlock controller 330 according to some embodiments. Interlock controller 330 can include a register update circuit 532 and a decision logic circuit 534, as well as an interface 536 to processing engines 321-324. In this example, four processing engines are present. It should be understood that any number of processing engines can be included in a pipeline, and that all processing engines in the same pipeline can communicate with the same interlock controller. Interlock controller 330 can maintain a virtual register file 332. As shown in FIG. 5, virtual register file 332 can include a data structure 532 (e.g., a lookup table) that tracks the status of each address in the pipeline address space. For instance, for each address or range of addresses in the pipeline (virtual) address space, data structure 532 can store information indicating whether any read-lock and/or write-lock is currently established and if so by which processing engine(s). In some embodiments, data structure 532 can store a list associated with an address or range of addresses that lists, in order of receipt, all read-locks and write-locks that have been received and not cleared.

Via interface 536, interlock controller 330 can receive requests from processing engines 321-324, including "Lock," "Clear," and "Poll" requests, and can send responses to processing engines 321-324, including "Grant" and "Deny" responses. In some embodiments, "Lock" and "Clear" requests are handled by register update circuit 532, while "Poll" requests are handled by decision logic 534. For instance, register update circuit 532 can update the contents of data structure 532 in response to each "Lock" or "Clear" request. The "Lock" request can specify a virtual address range to be locked (as used herein, an "address range" can encompass any amount of memory, including a single address) and whether the lock is a read-lock or write-lock. A read-lock indicates that the processing engine will read from the buffer location(s) corresponding to the virtual address range, and a write-lock indicates that the processing engine will write to the buffer location(s) corresponding to the virtual address range. A "Clear" request indicates that a read-lock or write-lock can be cleared; the request can specify the address range and type of lock (read-lock or write-lock) to be cleared. As each request is received, register update circuit 532 can update data structure 532 accordingly. In some embodiments, register update circuit 532 can send an acknowledgement ("Ack") response to the processing engine after updating data structure 532.

It should be understood that the address ranges of different "Lock" and "Clear" requests from different processing engines can overlap without exactly coinciding. For example, different processing engines within a pipeline may operate on different-sized blocks or chunks of data. Thus, for instance, in pipeline 310 of FIGS. 3 and 4, vector load engine 321 may write-lock a large address range for a single instruction while intermediate processing engine 322 read-locks a subset of that address range for each instruction. In some embodiments, data structure 532 can have sufficient granularity to track the status of each address in the virtual address space; a coarser granularity (e.g., rows or pages) can be used if desired. In some embodiments, the granularity can be selected based on the smallest size of data blocks handled by the processing engines.

A "Poll" request can be sent by a processing engine when it is ready to execute the next instruction in its dispatch queue. Each "Poll" request can identify a virtual address range and an operation (read or write) to be performed. Decision logic 534 can read data structure 532 using the virtual address range to determine whether all data dependencies for that address range have been satisfied, based on presence or absence of read-locks and write-locks. A specific example of decision logic is described below. If all data dependencies have been satisfied, decision logic 432 can send a "Grant" response to the processing engine that sent the "Poll" request; if not, decision logic 432 can send a "Deny" response.

In some embodiments, each message from a processing engine can include the processing engine identifier; alternatively, each processing engine 321-324 can be connected to a different (physical) port of interface 536 (shown in FIG. 5), and the port identifier can be used to identify the processing engine. Other implementations are also possible, provided that virtual register file 332 indicates which addresses have read-lock and/or write-lock established, and by which processing engines.

In some embodiments, processing engine interface 536 can implement arbitration logic to prioritize requests that may be received on the same clock cycle. For example, arbitration logic can prioritize requests according to a sequence assigned to processing engines in the pipeline (e.g., an upstream processing engine can be prioritized over a downstream processing engine), or a round-robin prioritization logic can be used. In some embodiments, time-division multiplexing (TDM) can be used, with each processing engine being assigned certain clock cycles during which its requests to interlock controller 330 will be serviced. TDM can be implemented, e.g., by including timing logic in each processing engine to determine when the processing engine sends requests or by providing buffers in interface 536 to store requests from different processing engines and to select a next request in a round-robin fashion. A variety of arbitration schemes can be used.

It will be appreciated that pipeline 310 is illustrative and that variations and modifications are possible. Any number of processing engines can be included in a pipeline, and a processing engine can implement any operation, including operations related to 4G and/or 5G data processing. The virtual address space can be defined as desired. The dispatch queue of a processing engine can hold any number of entries (one or more), and dispatch queues of different processing engines can have different depths. A processing engine can include one or more functional units; where multiple functional units are present, each functional unit can have a different associated instruction.

In some embodiments, a processing engine can include multiple functional units that execute sequential operations, and the processing engine can include a hardware sequencer to control sequencing of the operations in different functional units. The hardware sequencer can include an instance of interlock controller 330 and virtual register file 332 that is local to one processing engine. In other words, any processing engine within a pipeline such as pipeline 310 can implement a "sub-pipeline," and multiple sub-pipelines can be present within a given pipeline. Where a processing engine implements a sub-pipeline, the control processor (e.g., control processor 340) can just dispatch an instruction for the sub-pipeline, and the processing engine can be configured to execute all stages of the sub-pipeline successively in response to the instruction.

Figure 6:
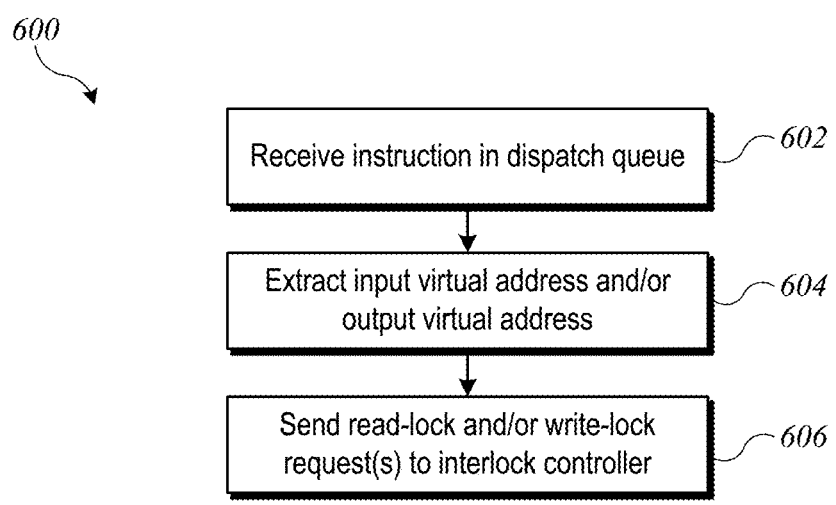
FIG. 6 shows a process that can be performed when an instruction is received into a processing engine according to some embodiments.
Figure 7:
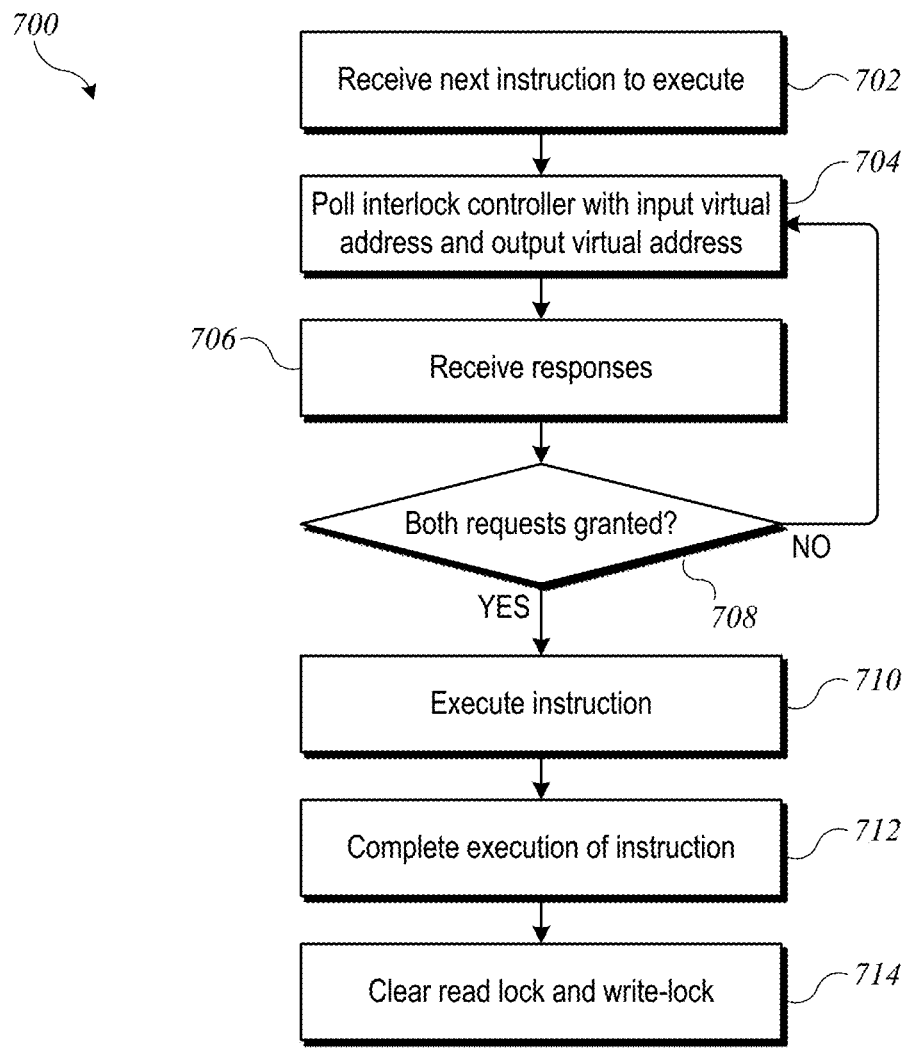
FIG. 7 shows a flow diagram of a process for executing an instruction in a processing engine according to some embodiments.
Figure 8:
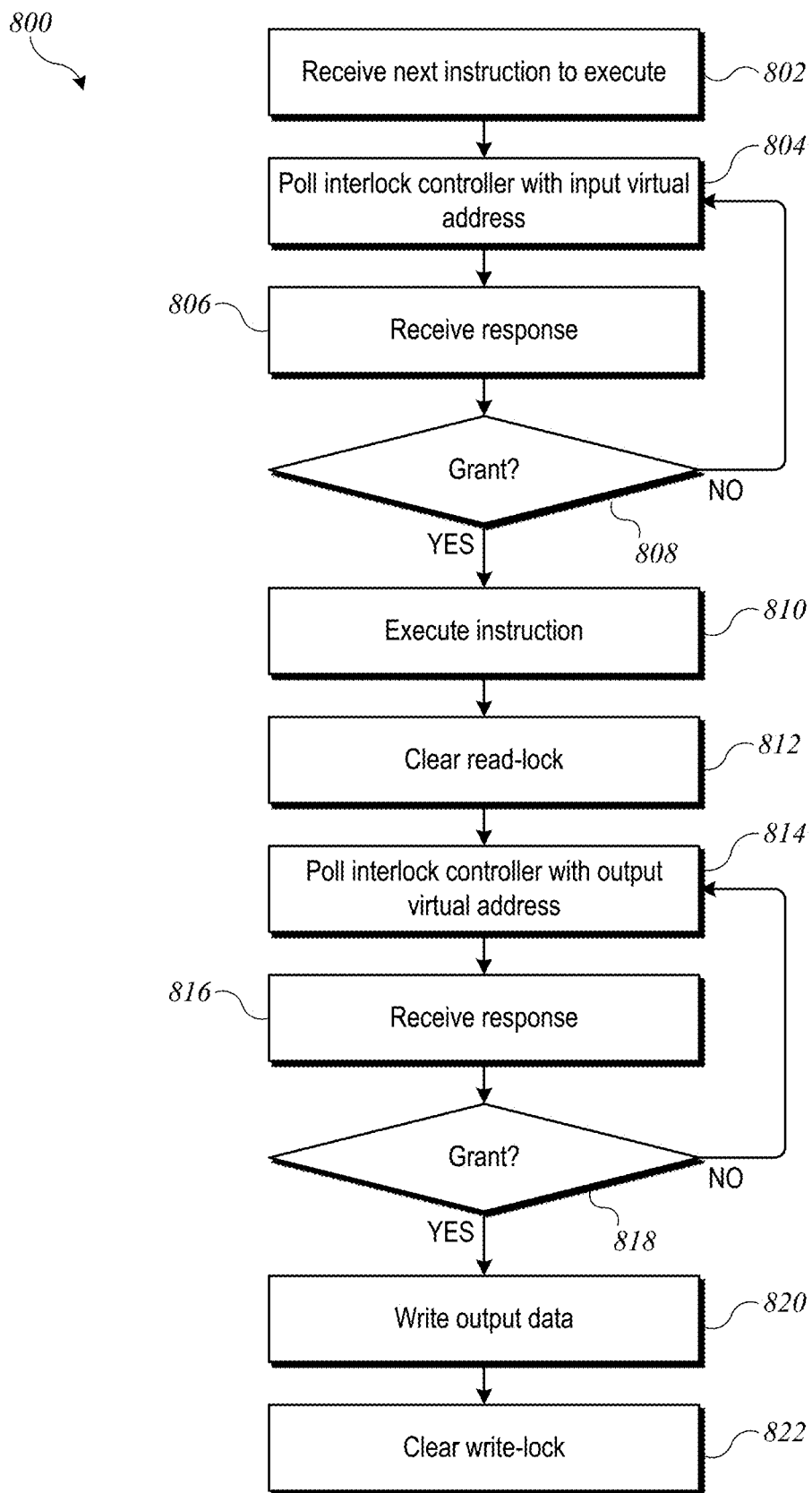
FIG. 8 shows a flow diagram of another process for executing an instruction in a processing engine according to some embodiments.

Examples of specific data synchronization operations that can be implemented within a pipeline (e.g., pipeline 310) using an interlock controller (e.g., interlock controller 330) will now be described. FIGS. 6, 7, and 8 show flow-control operations that can be implemented in each processing engine of a pipeline according to some embodiments. For instance, the operations shown can be implemented in each processing engine 321-324 of pipeline 310. FIG. 6 shows a process 600 that can be performed when an instruction is received by a processing engine according to some embodiments. Process 600 can be implemented, e.g., in dispatch queue interface 402 of each processing engine 321-324. At block 602, a new instruction is received at dispatch queue interface 402, e.g., from control processor 340 as described above. The new instruction can be added to dispatch queue 403 as it is received. At block 604, an input (read) virtual address range and an output (write) virtual address range can be extracted from the instruction. At block 606, a read-lock request for the input virtual address range and a write-lock request for the output virtual address range can be sent to interlock controller 330. Processing of the read-lock and write-lock requests by interlock controller 330 is described below. It should be understood that some instructions may result in generating only a read-lock request or only a write-lock request. For example, a "Load" instruction issued to vector load engine 321 can specify a read address range in the L1 memory space (which can be inside or outside the pipeline's virtual address space as desired) and a write virtual address that is in the pipeline's virtual address space; conversely, a vector-store instruction issued to vector store engine 324 can specify a read address range that is in the pipeline's virtual address space and a write address range in the L1 memory space (which, again, can be inside or outside the pipeline's virtual address space). In some embodiments, any input (or output) address that is outside the pipeline's buffers does not result in generating a read-lock (or write-lock) request. Thus, in some embodiments where the L1 memory space is not represented in the pipeline's virtual address space, a vector-load instruction can result in generating a write-lock request but not a read-lock request, while a vector-store instruction can result in generating a read-lock request but not a write-lock request. Where the L1 memory space is represented in the pipeline's virtual address space, a vector-load or vector-store instruction can generate both a read-lock request and a write-lock request. Where the L1 memory space is represented in the pipeline's virtual address space, the interlock controller can manage L1-memory data dependencies between instructions (e.g., load and store instructions) within the pipeline. As described above, L1 memory can be shared among multiple pipelines, and the L1 memory fabric can include additional features related to coordinating access requests across different pipelines.

After executing process 600, dispatch queue interface 402 can queue the instruction for execution (e.g., in dispatch queue 403) until all previously received instructions have been executed. At that point, instruction interface 404 can receive the instruction from dispatch queue 403 as the next instruction to be executed. FIG. 7 shows a flow diagram of a process 700 for executing an instruction in a processing engine (e.g., processing engine 322) according to some embodiments. At block 702, the next instruction to be executed can be received. For instance, instruction interface 404 can read the next instruction from dispatch queue 403. At block 704, the processing engine can poll the interlock controller to determine whether input data for the instruction is ready to be read and whether output data for the instruction can be safely written to the output buffer (e.g., buffer 410 or buffer 416 as the case may be). For example, processing engine 322 can send a first "Poll" request that includes the input virtual address range for the instruction and a second "Poll" request that includes the output virtual address range for the instruction to interlock controller 330. At block 706, the processing engine can receive a response to each polling request from the interlock controller. For example, interlock controller 330 can respond to each polling request with either a "Grant" or "Deny." If, at block 708, the response to one or both polling requests is not "Grant", process 700 can return to block 704 and poll the interlock controller again. In some embodiments, process 700 can wait one or more clock cycles before polling again. In some embodiments where processing engine 322 initially sends two "Poll" requests at block 704, if the response to one request is "Grant" and the response to the other request is "Deny," at the next iteration of block 704, process 700 can just send the poll request that has not yet been granted. In this manner, process 700 can continue to poll the interlock controller until the requests have been granted for both the input virtual address range and the output virtual address range.

If, at block 708, both requests have been granted, then at block 710, the processing engine can execute the instruction. For example, processing engine 322 can enable functional unit 422 to perform its operations. Once enabled, functional unit 422 can proceed to operate without further external control. Depending on the instruction and the implementation of functional unit 422, operations of functional unit 422 can include moving data from buffer locations identified by the input virtual address range into operand registers within functional unit 422, performing computations and/or logic operations, and/or moving data from the operand registers to buffer locations identified by the output virtual address range. In some embodiments, functional unit 422 may read a buffer location multiple times and/or write a buffer location multiple times. Since processing engine 322 maintains the read-lock and write-lock throughout execution, data in the locked buffers is not modified except by functional unit 422. At block 712, execution of the instruction can be completed, which can include, e.g., writing final output data for the instruction to buffer 416 (at locations corresponding to the output virtual address range).

At block 714, once execution is complete, the processing engine can send messages to the interlock controller to clear the read-lock for the input virtual address range and to clear the write-lock for the output virtual address range. For example, processing engine 322 can send a first "Clear" request to interlock controller 330 indicating that the read-lock for the input virtual address range should be cleared and a second "Clear" request to interlock controller 330 indicating that the write-lock for the output virtual address range should be cleared. In some embodiments, block 714 can occur after instruction execution is complete, which can include transferring output data from the registers within functional unit 422 to a buffer (e.g., buffer 410 or buffer 416 as the case may be).

Process 700 can be executed for each instruction in dispatch queue 403. In some embodiments, a processing engine performs process 700 for one instruction at a time, and process 700 for a second instruction can begin after execution of the first instruction is finished. Other implementations are also possible. For instance, in some embodiments, process 700 can begin for the second instruction while the first instruction is being executed at block 710. Depending on the implementation of the processing engine, if the polling requests for the second instruction are granted (block 708 results in "YES") before execution of the first instruction has finished, execution of the second instruction can begin (e.g., if it will not interfere with execution of the first instruction), or process 700 for the second instruction can wait to begin execution at block 710 until execution of the first instruction is completed. As described above, the instruction interface can be designed to issue instructions in order, in which case there is no benefit to polling the interlock controller for any instruction other than the instruction that is next to be executed. Different processing engines in a pipeline can perform process 700 independently of each other to process instructions in their respective dispatch queues. (Thus, instructions dispatched to different processing engines may execute out of order with respect to each other if data dependencies permit.)

In process 700, instruction execution begins only after both the read and write polling requests are granted, and the processing engine maintains the read-lock and write-lock for the instruction execution is complete. In some embodiments, it may be desirable to manage the read-locks and write-locks with finer granularity. By way of example, FIG. 8 shows a flow diagram of another process 800 for executing an instruction in a processing engine (e.g., processing engine 322) according to some embodiments. Process 800 can be generally similar to process 700. At block 802, the next instruction to be executed can be received. For instance, instruction interface 404 can read the next instruction from dispatch queue 403. At block 804, the processing engine can poll the interlock controller to determine whether input data for the instruction is ready to be read. For example, processing engine 322 can send a "Poll" request that includes the input virtual address range for the instruction to interlock controller 330. At block 806, the processing engine can receive a response from the interlock controller. For example, interlock controller 330 can respond with either a "Grant" or "Deny." If, at block 808, the response is "Deny" (or not "Grant"), process 800 can return to block 804 and poll the interlock controller again. In some embodiments, process 800 can wait one or more clock cycles before polling again.

If, at block 808, the response is "Grant," then at block 810, the processing engine can begin to execute the instruction. For example, processing engine 322 can read the input data from buffer 416 (at locations corresponding to the input virtual address range) into input registers of the appropriate functional unit 422 and enable functional unit 422 to perform its operations. Once enabled, functional unit 422 can proceed to generate output data without further external control. The output data can be temporarily stored in registers within functional unit 422.

At block 812, the processing engine can send a message to the interlock controller to clear the read-lock for the input virtual address range. For example, processing engine 322 can send a "Clear" request to interlock controller 330 indicating that the read-lock for the input virtual address range should be cleared. In various embodiments, block 812 can occur at any time after reading of all input data for the instruction from the input buffer by functional unit 422 is completed, including after instruction execution is completed.

At block 814, the processing engine can begin to poll the interlock controller to determine whether output data for the instruction can be safely written to the output buffer (e.g., buffer 410 or buffer 416 as the case may be). For example, processing engine 422 can send a "Poll" request that includes the output virtual address range for the instruction to interlock controller 330. In some embodiments, block 814 can occur at any point before functional unit 422 begins to write any data to the output buffer. For example, if functional unit 422 operates to produce a set of output data in local registers of processing engine 322, the output data can be held in the local registers until processing engine 322 determines that the output data can be written to the output buffer. At block 816, the processing engine can receive a response from the interlock controller. For example, interlock controller 330 can respond with either a "Grant" or "Deny." If, at block 818, the response is "Deny" (or not "Grant"), process 800 can return to block 814 and poll the interlock controller again. In some embodiments, process 800 can wait one or more clock cycles before polling again. If, at block 818, the response is "Grant," then at block 820, the processing engine can write the output data from the registers of the functional unit to the appropriate buffer. For example, processing engine 322 can write output data from registers of functional unit 422 to shared buffer 410. At block 822, after writing the output data, the processing engine can clear the write-lock. For example, processing engine 322 can send a "Clear" message to interlock controller 330 indicating that the write-lock for the output virtual address range should be cleared. Thereafter, process 800 can be repeated for the next instruction in dispatch queue 403.

As processes 700 and 800 illustrate, the point at which a processing engine begins polling the interlock controller for the virtual input address and/or virtual output address can be varied. Polling for both the virtual input address and the virtual output address prior to beginning execution (as in process 700) can simplify the logic and can be particularly appropriate in instances where executing the instruction can involve a series of read and/or write operations targeting a virtual address or range of virtual addresses. Similarly, the point at which a processing engine clears a read-lock and/or a write-lock can be varied. Clearing a read-lock (or write-lock) as soon as the last read operation (or write operation) that occurs during execution of an instruction can help to reduce wait times for subsequent instructions, but for some types of instructions, e.g., instructions where execution involves multiple read-modify-write operations, waiting until the end of the instruction may be desirable.

Figure 9:
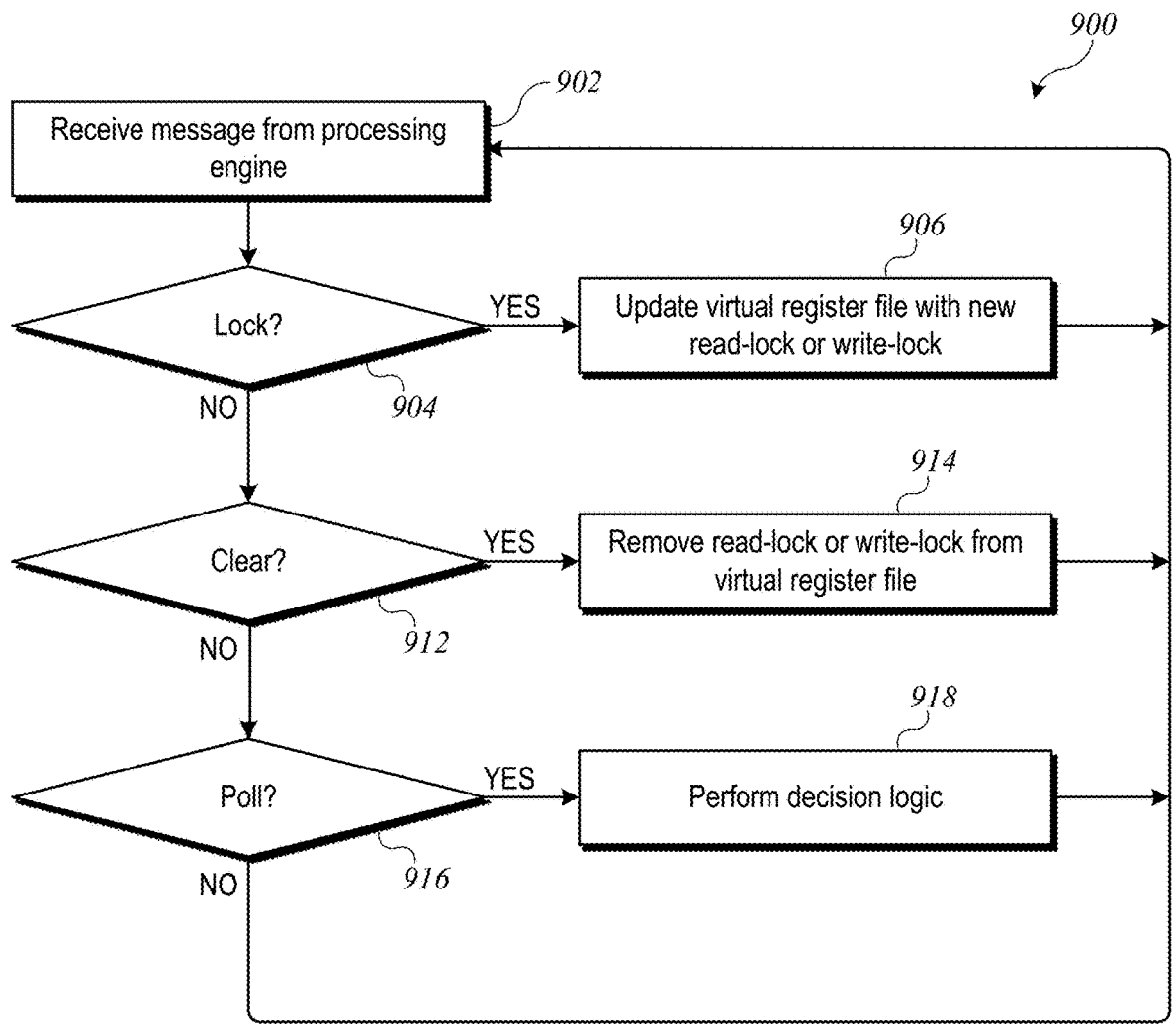
FIG. 9 shows a flow diagram of a process that can be performed by an interlock controller according to some embodiments.
Figure 10:
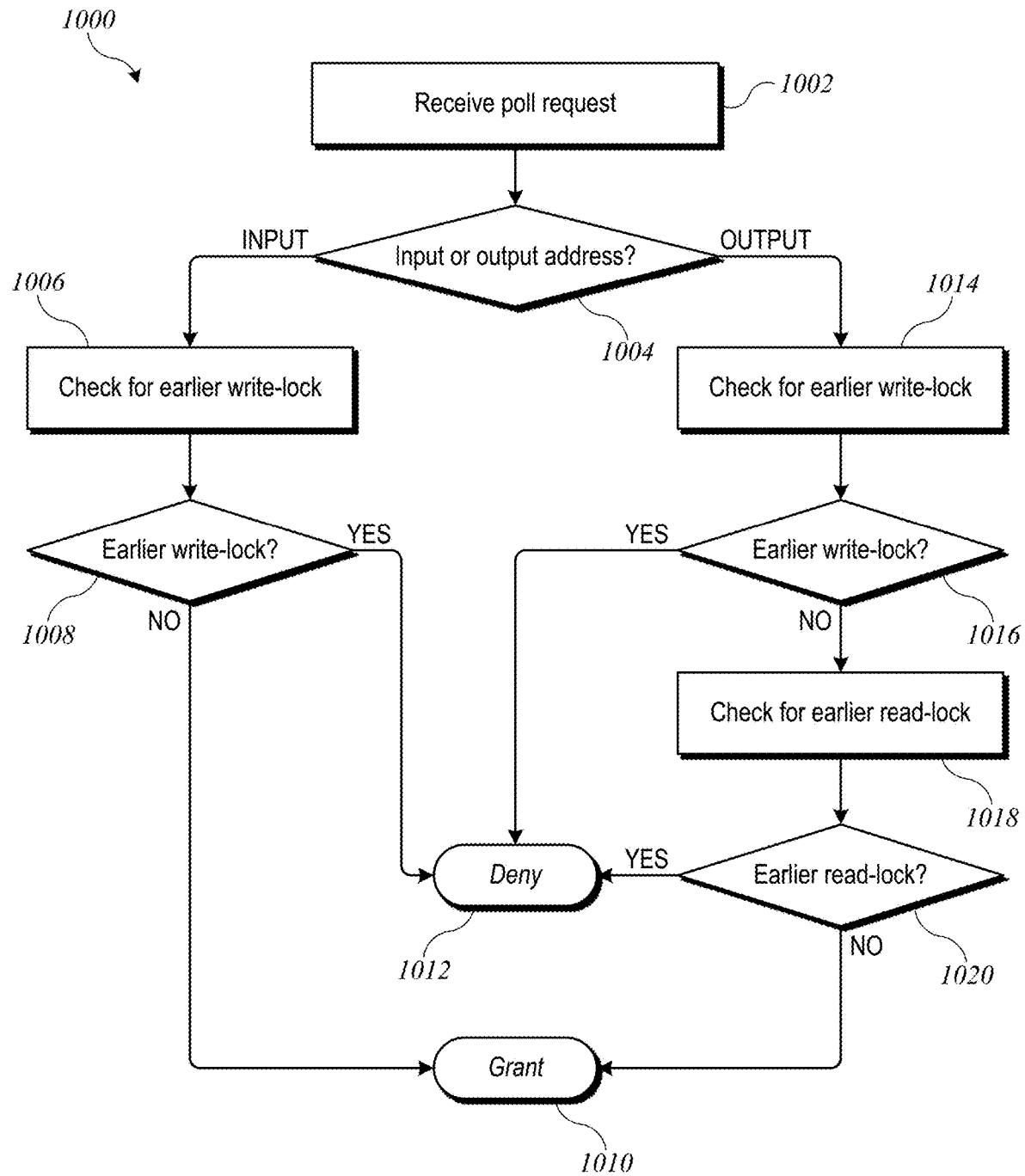
FIG. 10 is a flow diagram of a decision-logic process for an interlock controller according to some embodiments.

In processes 600, 700, and 800, an interlock controller (e.g., interlock controller 330) can receive "Lock" requests to establish read-lock or write-lock, "Clear" requests to remove previously established read-lock or write-lock, and "Poll" requests to query whether data dependencies for a particular read or write operation have been satisfied. FIGS. 9 and 10 are flow diagrams showing operation of an interlock controller such as interlock controller 330.

FIG. 9 shows a flow diagram of a process 900 that can be performed by an interlock controller (e.g., interlock controller 330) according to some embodiments. Process 900 can execute in a continuous loop as messages are received from the processing engines of a pipeline (e.g., pipeline 310). At block 902, a message is received from a processing engine. For example, messages can be received at processing engine interface 536 of interlock controller 330 as shown in FIG. 5. In some embodiments, block 902 can include arbitrating among multiple requests to select a request to process, e.g., as described above with reference to FIG. 5.

If, at block 904, the message is a Lock message, then at block 906, the interlock controller can update the virtual register file (VRF) by adding read-lock or write-lock information for the virtual address range specified in the read-lock or write-lock message. The particular information added can depend on the particular implementation of virtual register file 332 (e.g., data structure 532). For example, in some embodiments, when a read-lock or write-lock is requested by a particular processing engine (e.g., processing engine 322), interlock controller 330 can add an entry to a lock list associated with one or more addresses in the virtual address range specified in the message; the entry can include the identifier of the requesting processing engine and the type of lock (read-lock or write-lock). The list can be an ordered list that reflects the order in which lock requests are received.

If the message is not a Lock message, process 900 proceeds to block 912. If, at block 912, the message is a Clear message, then at block 914, the interlock controller can update the virtual register file by removing (clearing) the read-lock or write-lock information specified in the Clear message. For instance, if adding the read-lock or write-lock information is implemented by adding an entry to a lock list, then clearing the read-lock or write-lock information can be implemented by deleting that entry from the lock list. In some embodiments, the oldest entry having the same processing engine and address range as specified in the Clear message is deleted.

If the message is not a Lock message or a Clear message, process 900 proceeds to block 916. If, at block 916, the message is a Poll message, then at block 918, the interlock controller can invoke decision logic (e.g., decision logic 534) to generate a response (e.g., Grant or Deny), based on whether all relevant data dependencies reflected in the virtual register file have been satisfied. FIG. 10 is a flow diagram of a decision-logic process 1000 according to some embodiments. Process 1000 can be implemented, e.g., in decision logic 534 shown in FIG. 5, and can be performed at block 918 of process 900.

At block 1002, the decision logic can receive a poll request, which can include a virtual address range and an indication of whether the poll request is for an input (read) address range or an output (write) address range. If the poll request is for an input address range, the data dependencies of concern are read-after-write dependencies. If the poll request is for an output address range, then the data dependencies of concern include both write-after-read and write-after-write dependencies. At block 1004, if the poll request is for an input address range, process 1000 can proceed to block 1006. At block 1006, process 1000 can check for any write-lock on any address within the range that was established prior to the read-lock that corresponds to the poll request. In some embodiments, the read-lock that corresponds to the poll request can be recognized as the earliest read-lock for the address range of the poll request that was requested by the processing engine that made the poll request. For example, if virtual register file 332 stores a lock list for a virtual address or virtual address range, processing at block 1006 can include reading the lock list for each address in the input address range to determine whether any write-locks are present ahead of a read-lock associated with the processing engine that sent the poll request. An earlier write-lock indicates a read-after-write data dependency that should be cleared before the requesting processing engine begins to read. At block 1008, if any earlier write-lock exists, then the request should be denied and a "Deny" message can be sent at block 1012. If no earlier write-lock exists, then the request should be granted, and a "Grant" message can be sent at block 1010.

If, at block 1004, the poll request is for an output address range, process 1000 can proceed to block 1014. At block 1014, process 1000 can check for any write-lock on any address within the range that was established prior to the write-lock that corresponds to the poll instruction. In some embodiments, the write-lock that corresponds to the poll request can be recognized as the earliest write-lock for the address range of the poll request that was requested by the processing engine that made the poll request. For example, if virtual register file 332 stores a lock list for a virtual address or virtual address range, processing at block 1014 can include reading the lock list for each address in the input address range to determine whether any write-locks are present ahead of a write-lock associated with the processing engine that sent the poll request. An earlier write-lock indicates a write-after-write data dependency that should be cleared before the requesting processing engine begins to write. At block 1016, if any earlier write-lock exists, then the request should be denied and a "Deny" message can be sent at block 1012. If no earlier write-lock exists, then at block 1018, process 1000 can check for any read-lock on any address within the range that was established prior to the write-lock that corresponds to the poll instruction. In some embodiments, the write-lock that corresponds to the poll request can be recognized as the earliest write-lock for the address range of the poll request that was requested by the processing engine that made the poll request. For example, if virtual register file 332 stores a lock list for a virtual address or virtual address range, processing at block 1018 can include reading the lock list for each address in the input address range to determine whether any read-locks are present ahead of a write-lock associated with the processing engine that sent the poll request. An earlier read-lock indicates a write-after-read data dependency that should be cleared before the requesting processing engine begins to write. At block 1020, if any earlier read-lock exists, then the request should be denied and a "Deny" message can be sent at block 1012. If no earlier read-lock exists, then the request should be granted, and a "Grant" message can be sent at block 1010. Process 1000 can be performed each time a Poll request is received.

Referring again to FIG. 9, in some embodiments of process 900, any message that is not identified as a Lock, Clear, or Poll request can be ignored. In other embodiments, such messages may generate a response, e.g., a negative-acknowledgement ("Nack") indicating that the message was not processed.

It will be appreciated that the processes shown in FIGS. 6-10 are illustrative and that variations or modifications are possible. Order of operations can be modified to the extent that logic permits, operations described separately can be combined, and additional operations not specifically described can be included. For example, the particular point during instruction execution at which a processing engine clears a read-lock or write-lock can be modified, provided that the read-lock (write-lock) is not cleared until the processing engine has finished reading (writing) data from (to) the address range associated with the lock.

In some embodiments, a processing engine can clear a read-lock (or write-lock) for part of an address range. Such partial clearing of a lock may allow another processing engine to begin execution sooner; tradeoffs include more requests to be handled by interlock controller and additional logic in the processing engine to determine when partial clearing is safe.

In some embodiments polling can be replaced by a notification protocol in which the interlock controller determines which processing engines have instructions that are clear of data dependencies and notifies the processing engines without waiting to be polled. (A notification protocol, however, may require more complex decision logic in the interlock controller.) In some embodiments, a pipeline flush operation can be defined that clears all instructions from the dispatch queues and clears all read-locks and write-locks from the virtual register file.

Some embodiments described herein relate to PDCCH decoding pipelines. In 4G and 5G networks, PDCCH is a (logical) channel that carries downlink control information ("DCI"). For example, in 4G and 5G networks, one or more DCI blocks containing the control information are generated at the transmitter side. Each DCI block has cyclic redundancy check (CRC) bits appended. The CRC bits are masked according to the radio network temporary ID (RNTI), then encoded. For 5G, the encoding includes interleaving followed by polar coding; for 4G, the encoding uses tail-bite convolutional coding. Encoded DCI blocks are sub-block interleaved, rate-matched, scrambled, and mapped into quadrature phase shift keying (QPSK) symbols, which are mapped to resource element groups within a resource grid that can also include other resource element groups assigned to other logical channels (e.g., PDSCH), reference signals, or other uses. For both 4G and 5G, the assignment of PDCCH to particular resource element groups within a resource grid is not specified (although the standards define some constraints). The resource grid is the basis for generating a time-domain signal that is mixed with an RF carrier signal and transmitted as a cell over the channel. For purposes of the present description, it is assumed that the RF signal for a cell has been received, converted to baseband, digitized, and transformed to the frequency domain. It is also assumed that, in the case of a 5G network, a number of control resource sets (CORESETs) have been extracted from the received data, where each CORESET corresponds to a set of resource elements within a specific area in the downlink Resource Grid (as defined in 5G network standards) that can be used to carry DCI. Each CORESET is demapped (using QPSK) to produce LLRs, and candidate control channel elements or DCI blocks for the CORESET are gathered. Because the particular location of the DCI blocks within the resource grid is not known to the receiver, the receiver generally needs to decode multiple candidates (e.g., dozens) per cell in order to extract all of the DCI. Similarly, in the case of a 4G network, the process for extracting candidate resource element groups containing DCI from received transmission is different, but the result is the same: the receiver needs to decode multiple candidates in order to extract all of the DCI. In some embodiments, a PDCCH decoding pipeline is provided to decode multiple candidates with high throughput. The input to a PDCCH decoding pipeline can be a set of log likelihood ratios (LLR), where each LLR indicates the relative likelihood that a particular bit (at the transmitter) was 0 or 1. The particular manner in which LLRs are determined is not relevant to understanding the present disclosure. The PDCCH decoding pipeline can receive the LLRs for a group of DCI candidates and apply a PDCCH decoding process, including descrambling, rate recovery, sub-block deinterleaving, decoding (e.g., polar decoding for 5G or convolutional decoding for 4G), and CRC verification. In some embodiments, throughput of the PDCCH decoding pipeline can be high enough to support decoding up to dozens of candidates per cell order to extract all of the DCI. In some embodiments, the same PDCCH decoding pipeline can support both 4G and 5G operation.

Figure 11:
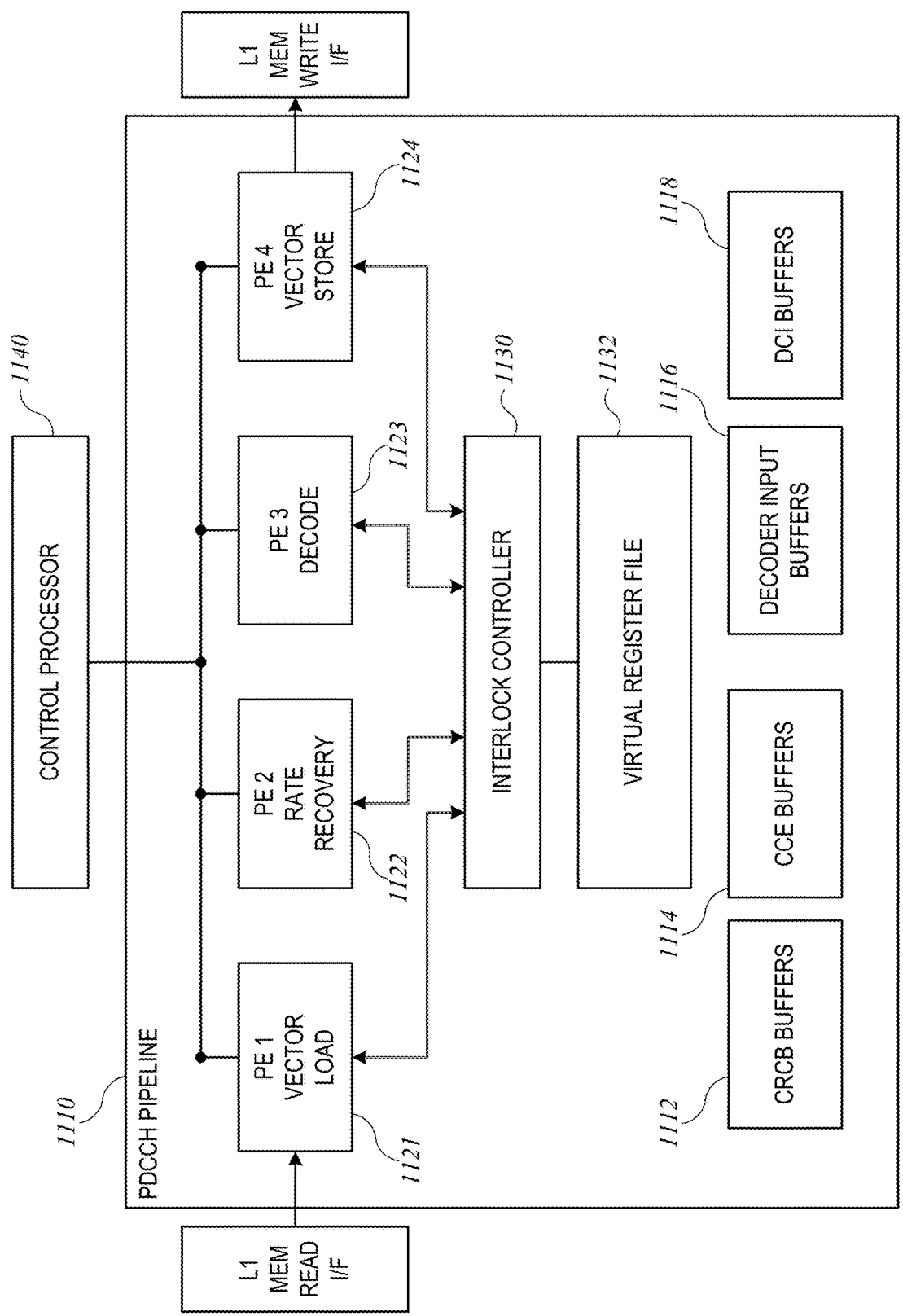
FIG. 11 shows a simplified high-level block diagram of a PDCCH decoding pipeline according to some embodiments.

FIG. 11 shows a simplified high-level block diagram of a PDCCH decoding pipeline 1110 according to some embodiments. PDCCH decoding pipeline 1110 can be an instance of pipeline 310 described above and can operate to decode candidates (data sets that have been identified as potentially corresponding to DCI blocks, also referred to herein as "candidate data elements"). Pipeline 1100 can apply the appropriate process for decoding a DCI block to each candidate, thereby facilitating determination as to whether the candidate is or is not a DCI block. Vector load engine 1121 and vector store engine 1124 can be similar to vector load engine 321 and vector store engine 324 described above. Vector load engine 1121 can write data from L1 memory into CRC bitmap (CRCB) buffers 1112 and/or control channel element (CCE) buffers 1114. Processing engine 1122 can implement rate recovery operations, which can include, e.g., descrambling, de-rate-matching and sub-block de-interleaving. In some embodiments, processing engine 1122 can read the LLRs for a candidate from CCE buffers 1114, perform the rate recovery operations, and write the output to decoder input buffers 1116. Processing engine 1123 can implement decoder algorithms for PDCCH. In some embodiments, processing engine 1123 can implement both a polar decoder (e.g., to decode polar-coded DCI for 5G PDCCH) and a convolutional decoder (e.g., to decode convolution-coded DCI for 4G PDCCH). For a given candidate, the appropriate decoder can be selected, as described below. Processing engine 1123 can also implement RNTI/CRC checking and generation of metrics for each candidate. (The metrics can include any information that may be helpful in determining whether to accept a particular decoded candidate as a DCI block.) Processing engine 1123 can store decoded candidates and associated metrics to DCI output buffers 1118. Vector store engine 1124 can write data from any of CRCB buffers 1112, CCE buffers 1114, decoder input buffers 1116, and/or DCI output buffers 1118 to L1 memory. In some embodiments, vector store engine 1124 can be used for logging and debugging. Control processor 1140 and interlock controller 1130 can be similar or identical to control processor 340 and interlock controller 330 described above. As with other interlock controllers described herein, interlock controller 1130 can maintain a virtual register file 1132 to track data dependencies between processing engines 1121-1125.

Figure 12:
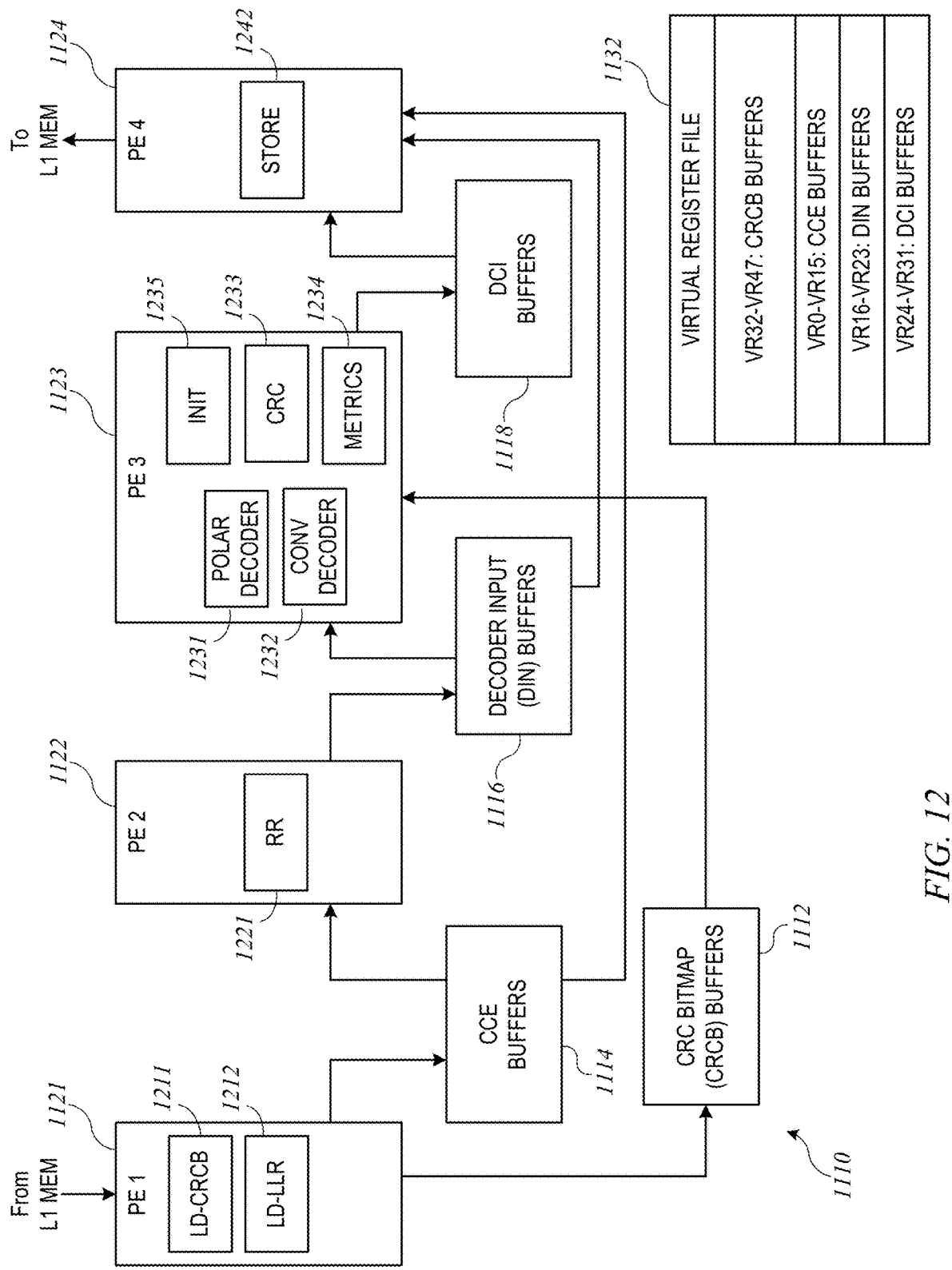
FIG. 12 shows another block diagram of a PDCCH decoding pipeline according to some embodiments.

FIG. 12 shows another block diagram of PDCCH decoding pipeline 1110, showing additional details of data paths and functional units. Processing engine 1121 includes functional units 1211 and 1212. Functional unit 1211 can execute a LD-CRCB instruction that reads a CRC masking pattern (or bitmap) from L1 memory. (It should be understood that all names used herein to refer to instructions executed in various functional units of pipeline 1100 are used solely for convenience of description and are not intended to define or imply a particular instruction set architecture.) The CRC masking bitmap can be based on the RNTI. In some embodiments, the CRC masking pattern for all candidates in a CORESET is the same, and the LD-CRCB instruction is used to load the masking pattern for each CORESET. Functional unit 1212 can execute a LD-LLR instruction that reads LLRs for a candidate from L1 memory into CCE buffers 1114.

Processing engine 1122 includes functional units 1221-1223. Functional unit 1221 can read a sub-block of a candidate from CCE buffers 1114 and perform descrambling using an appropriate bit sequence (which can be provided to functional unit 1221 as a control parameter or the like). Functional unit 1222 can perform de-rate-matching (DRM) on data output from functional unit 1221. Functional unit 1223 can perform sub-block deinterleaving on data output from functional unit 1222. The implementation of descrambling, de-rate-matching and deinterleaving can use conventional or other algorithms that reverse the interleaving, rate matching and scrambling operations performed at the transmitter in a given communications network. As noted above, pipeline 1110 can support multimode operation, including operating modes compatible with different communication standards such as 4G and 5G. To the extent that different communication standards specify different algorithms for interleaving, rate matching and scrambling, pipeline 1110 can adapt accordingly, e.g., through the use of parameters written to control and status registers of processing engine 1122 and/or providing different functional units to support the different operating modes. In some embodiments, functional units 1221-1223 form a sub-pipeline: functional unit 1221 can read LLRs corresponding to a sub-block from CCE buffers 1114 and provide the LLR data to functional unit 1222 via a local vector register file (not shown) within processing engine 1122. Functional unit 1222 can execute de-rate-matching on the LLR data provided from functional unit 1221 and write the de-rate-matched LLR data to the local vector register file within processing engine 1122. Functional unit 1223 can execute sub-block de-interleaving on the data provided from functional unit 1221 and write the de-interleaved LLRs to decoder input buffers 1116. As noted above, to implement the sub-pipeline, processing engine 1122 can include a local interlock controller (not shown) to manage data dependencies in the local vector register file between functional units 1221-1223. The local interlock controller can operate similarly to other interlock controllers described herein. In some embodiments, control processor 1140 can dispatch separate instructions to invoke descrambling, de-rate-matching, and/or deinterleaving for the LLR data, and a sub-pipeline is not required.

Processing engine 1123 can include functional units to support decoding of candidates. In the example shown, processing engine supports 4G and 5G PDCCH decoding modes, with different functional units implementing different decoders. For example, functional unit 1231 can implement a polar decoder, such as a successive cancellation list (SCL) polar decoder, configured to decode a 5G DCI block while functional unit 1232 implements a convolutional decoder configured to decode a 4G DCI block. (Examples of polar-decoder implementations that can be used in functional unit 1231 are described in above-referenced U.S. Application No. U.S. patent application Ser. No. 17/484,982; other implementations can also be used.) Control processor 1140 can invoke the appropriate decoder for a particular candidate by dispatching either a PDECODE instruction that is executed by functional unit 1231 or a CDECODE instruction that is executed by functional unit 1232. Processing engine 1123 can also include other functional units, such as functional units to perform CRC verification using the CRC/RNTI bitmap from CRCB buffers 1112 (e.g., functional unit 1233), metric computation (e.g., functional unit 1234), and initialization of the decoder functional units (e.g., functional unit 1235). Depending on implementation, separate instances of functional units 1233 and 1234 can be provided for 4G and 5G PDCCH decoding, or differences between 4G and 5G algorithms for CRC verification and/or metric computation can be managed using control parameters provided by control processor 1140 to processing engine 1123. The implementation of each functional unit 1231-1235 can use conventional or other algorithms appropriate to the supported operating mode(s) (e.g., 4G and/or 5G). In some embodiments, processing engine 1123 can implement a sub-pipeline such that after completion of decoding in either functional unit 1231 or functional unit 1232, CRC verification in functional unit 1233 and/or metric computation in functional unit 1234 are automatically performed. As noted above, to implement the sub-pipeline, processing engine 1123 can include a local interlock controller (not shown) to manage data dependencies in the local vector register file among functional units 1231-1234. The local interlock controller can operate similarly to other interlock controllers described herein. In some embodiments, control processor 1140 can dispatch separate instructions to invoke decoding, CRC verification, and/or metric generation, and a sub-pipeline is not required.

Processing engine 1124 can include a functional unit 1242 that executes a STORE instruction to store data from any of buffers 1112, 1114, 1116, 1118 to L1 memory. As described below, in some embodiments, control processor 1140 can dispatch register read instructions to read from DCI buffers 1118 directly, and in some embodiments STORE instructions can be used for logging and debugging, regardless of whether they are used as a regular part of data flow. If desired, control processor 1140 can dispatch STORE instructions to transfer decoded output data from DCI buffers 1118 to L1 memory, after which control processor 1140 or other components of a cellular modem processor in which pipeline 1110 is implemented (e.g., processor 200 of FIG. 2) can read the data from L1 memory.

In some embodiments, CRCB buffers 1112, CCE buffers 1114, decoder input buffers 1116, and DCI buffers 1118 can be mapped to different locations in the virtual address space of PDCCH pipeline 1110. An example mapping is shown in virtual register file 1132. In this example, virtual addresses VR0-VR15 can map to locations in CCE buffers 1114; virtual addresses VR16-VR23 can map to locations in decoder input buffers 1116; virtual addresses VR24-VR31 can map to locations in DCI buffers 1118; and virtual addresses VR32-VR47 can map to locations in CRCB buffers 1112. In some embodiments, each virtual address (VRr) maps to a region within the relevant buffer that can store the relevant data for one thread, where a thread can correspond to a sequence of operations to decode one candidate. Thus, for example, each of virtual addresses VR0-VR15 can map to a different region within CCE buffers 1114, with each region being large enough to store the LLRs for one sub-block of a candidate. Similarly, each of virtual addresses VR16-VR23 can map to a different region within decoder input buffers 1116, with each region being large enough to store the LLRs for one candidate. Continuing the example, each of virtual addresses VR24-VR31 can map to a different region within DCI buffers 1118, with each region being large enough to store the decoded bits and metrics for a decoded candidate, and each of virtual addresses VR32-VR47 can map to a different region within CRC buffers 112, with each region being large enough to store a CRC bitmap for a CORESET. Regions can have any size, provided that data written into the region associated with one virtual address by one thread does not extend into a region associated with a different virtual address. The various regions can be larger if desired. Where PDCCH pipeline 1110 supports multiple communication standards (e.g., 4G and 5G), the size of each region can be selected based on the standard that requires the larger amount of space. In some embodiments, the different regions within a buffer (e.g., any of buffers 1112, 1114, 1116, 1118) can be implemented as separate memory structures (e.g., with separate read and write paths), or the different regions can correspond to different locations within a single memory structure. Similarly, different buffers can be implemented as separate memory structures or separate locations within a single memory structure. As long as each virtual address in virtual register file 1132 maps to a different, non-overlapping physical data-storage location (or group of such locations) the implementation of buffers and registers described herein can be varied as desired. In some embodiments, the virtual address space can also include one or more virtual addresses mapped to L1 memory (or portions thereof).

As with any implementation of pipeline 310 of FIG. 3, operation of pipeline 1110 can be defined using program code (e.g., firmware) executed by control processor 1140. Control processor 1140 can issue instructions in order to pipeline 1110, and each instruction can enter the dispatch queue (shown in FIG. 4) of the appropriate one of processing engines 1121-1124. The instructions can specify virtual addresses in the virtual address space of pipeline 1110 (e.g., virtual register file 1132), which can encompass all locations in CRCB buffers 1112, CCE buffers 1114, decoder input buffers 1116, and DCI buffers 1118.

Processing engines 1121-1124 can interact with interlock controller 1130 as described above with reference to FIGS. 6 and 7. For example, receipt of an instruction in the dispatch queue of any of processing engines 1121-1124 can trigger sending of a read-lock request for the input virtual address and/or a write-lock request for the output virtual address to interlock controller 1130 (e.g., as shown in FIG. 6). Completion of an instruction in any one of processing engines 1121-1124 can trigger sending of a clear request to interlock controller 1130 (e.g., as shown in FIG. 7). Prior to executing the next instruction in the dispatch queue, each processing engine 1121-1124 can poll interlock controller 1130 with the input virtual address and/or output virtual address of the instruction (as appropriate) and can wait to execute the instruction until interlock controller 1130 returns a Grant response for all polled virtual addresses 1130 (e.g., as shown in FIG. 7). Interlock controller 1130 can implement the logic described above (e.g., as shown in FIGS. 9 and 10) to respond to read-lock, write-lock, clear, and poll requests. Thus, data synchronization within pipeline 1110 can be agnostic to the particular processing activity of processing engines 1121-1124.

Figure 13A:
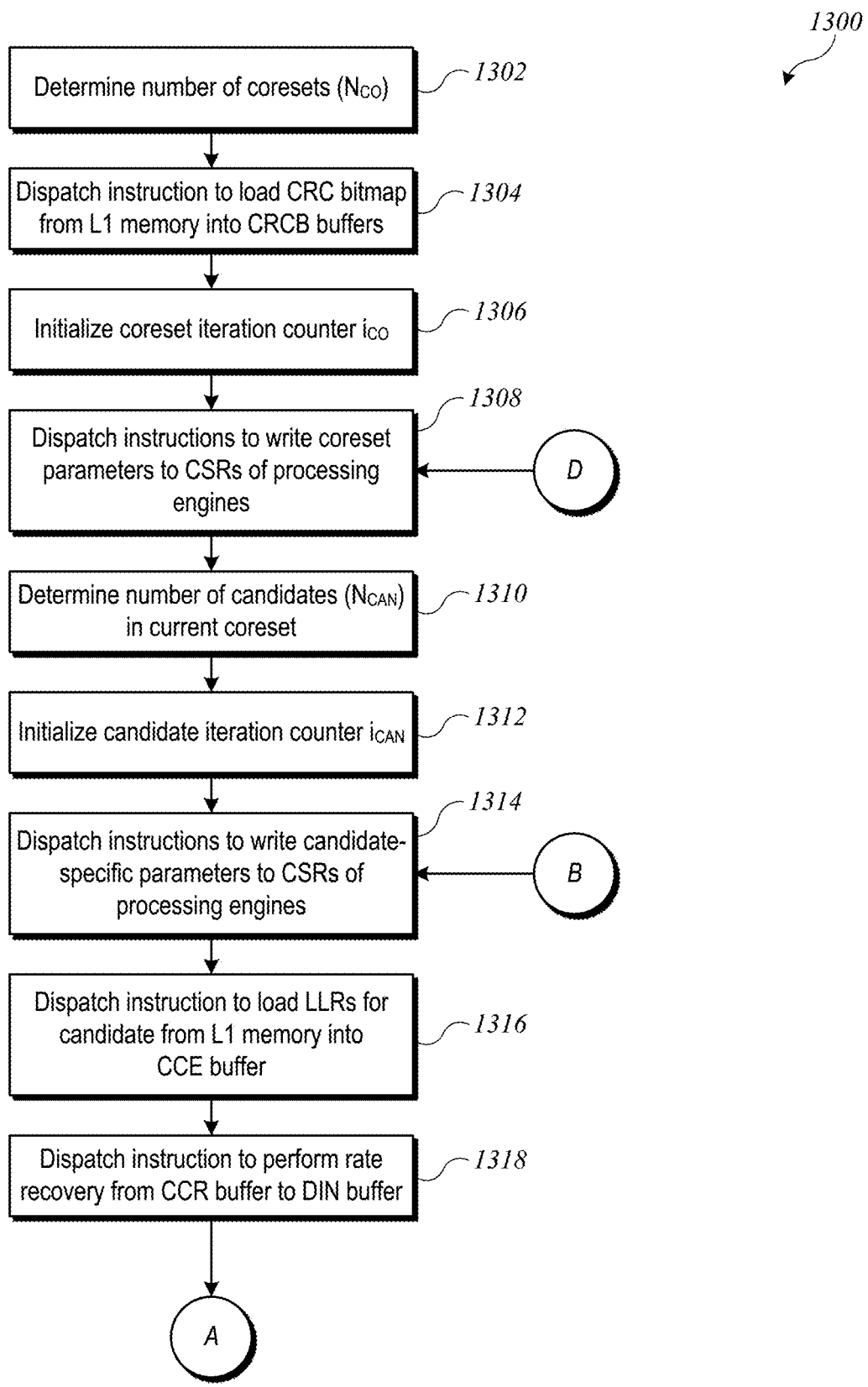
FIGS. 13A-13C show a flow diagram of a process for 5G PDCCH decoding according to some embodiments.
Figure 13B:
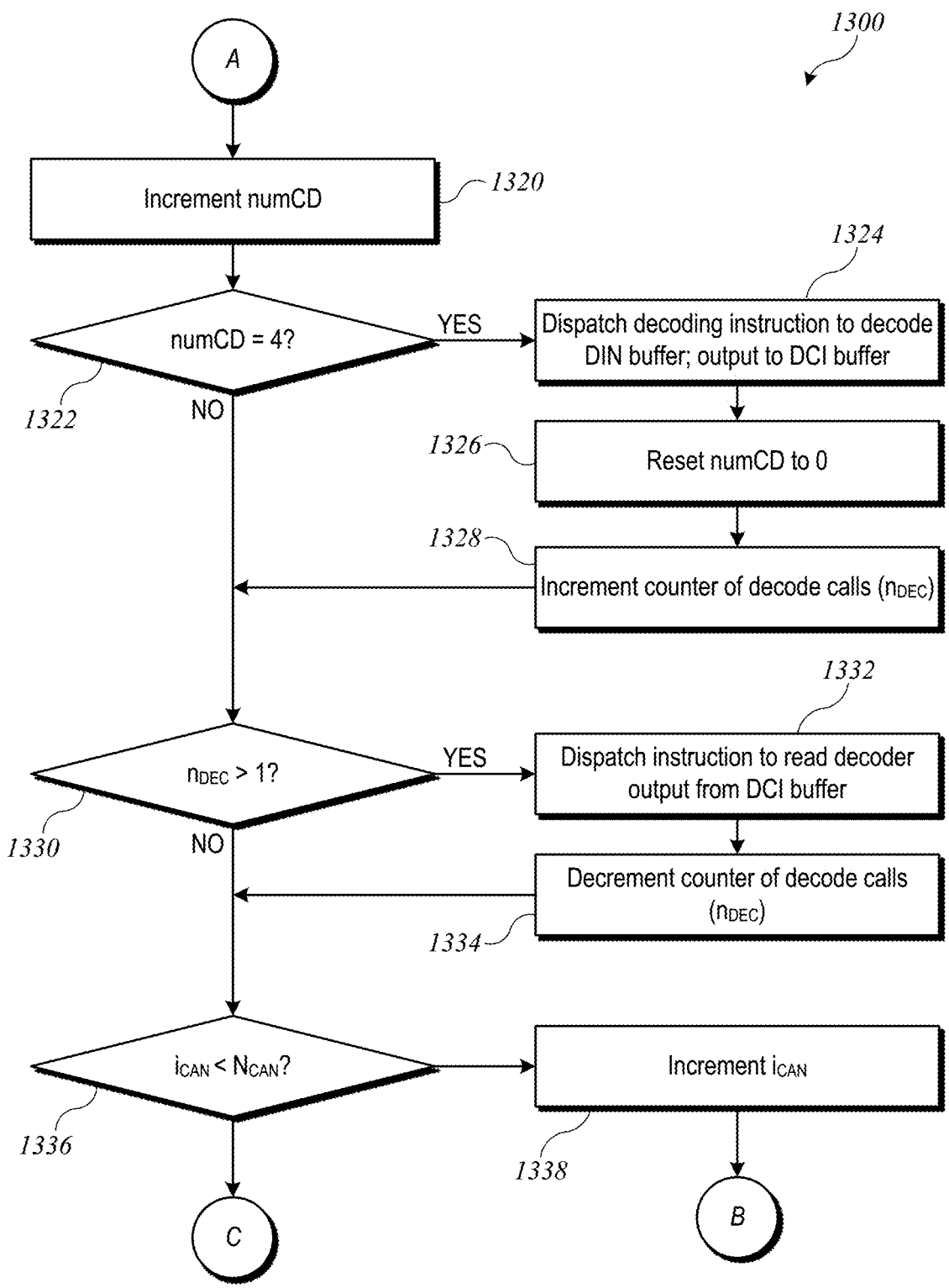
Figure 13C:
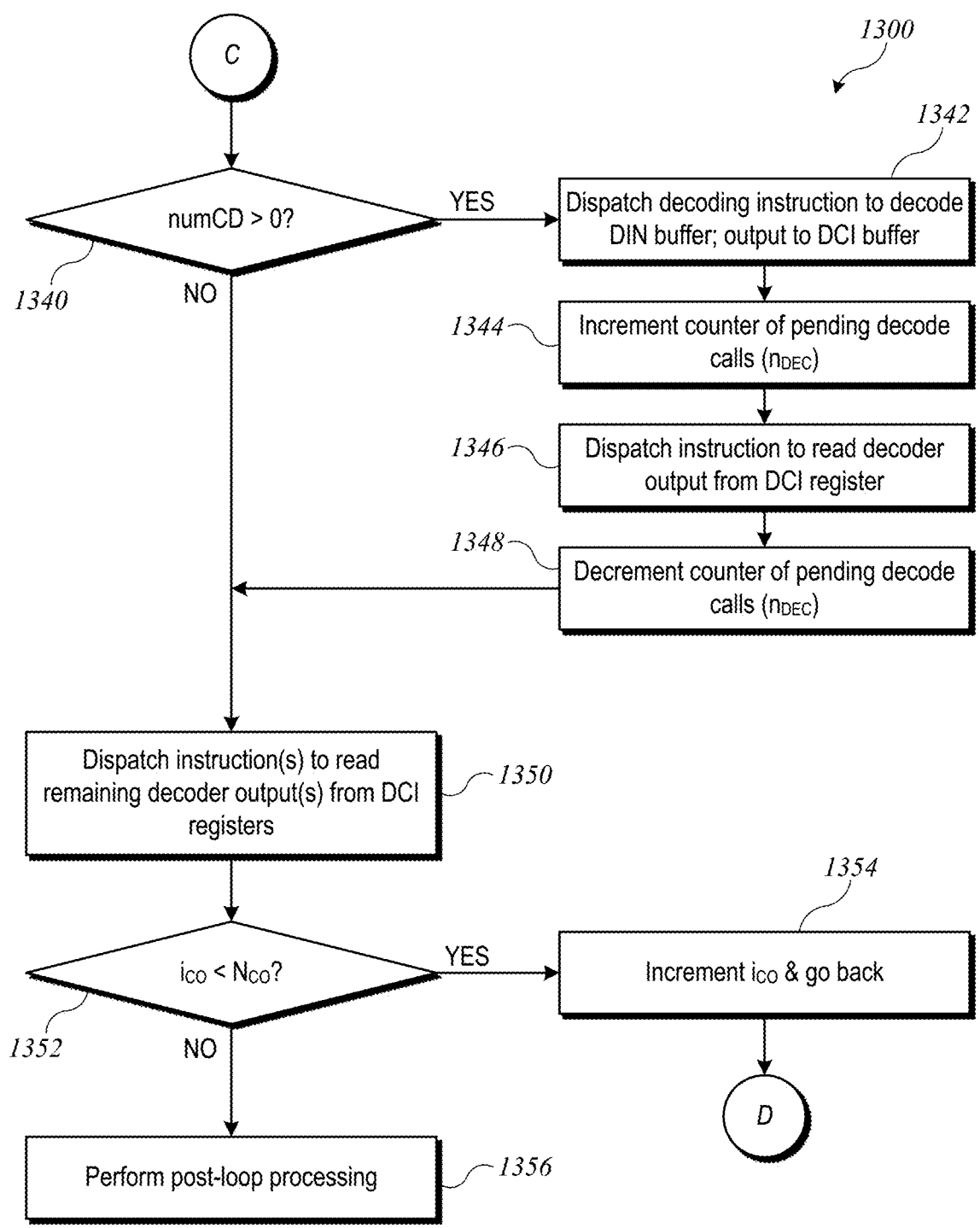

To illustrate operation of pipeline 1110, reference is made to FIGS. 13A-13C, which show a flow diagram of a process 1300 for 5G PDCCH decoding using pipeline 1110 according to some embodiments. Process 1300 includes an initialization stage, a CORESET processing loop that has a nested candidate processing loop, and a post-loop stage following the CORESET processing loop. Process 1300 can be implemented, e.g., using program code to define a routine (e.g., function or subroutine) to be executed by control processor 1140 at a time when LLRs for a CORESET have been stored in L1 memory of the cellular modem processor in which control processor 1140 and pipeline 1110 reside. In some embodiments, invoking process 1300 can include providing a pointer or other reference to the location in L1 memory where the LLRs are stored, as well as additional information about the CORESET.

Referring first to FIG. 13A, the initialization stage of process 1300 can begin at block 1302, when a number ($N_{CO}$) of CORESETs to process is determined. In some embodiments, the number of CORESETs can be included in the received information about the CORESET. At block 1304, control processor 1140 can dispatch a LD-CRCB instruction to pipeline 1110. The LD-CRCB instruction can specify an address in L1 memory where the RNTI/CRC bitmap (which is fixed for a given CORESET) is stored as an input (or source) address and CRCB buffer 1112 as an output (or destination) virtual address. In some embodiments, the output virtual address can be selected cyclically from virtual addresses VR32-VR47. For example, control processor 1040 can maintain a counter K of the number of previous executions of process 1300, and the virtual address can be selected as VR[32+(16% K)]. (In notation used herein, a % b denotes the modulo operation that returns the remainder of dividing a by b.) Other selection techniques can be used. When the LD-CRCB instruction is executed by functional unit 1211, an RNTI/CRC bitmap can be loaded into the selected location in CRCB buffer 1112. In some embodiments, the initialization stage can also include other operations. For instance, control processor 1140 can write parameter values into control and status registers of pipeline 1110 by dispatching appropriate instructions. At block 1306, control processor 1040 can initialize a CORESET iteration counter ($i_{CO}$), e.g., by setting $i_{CO}=0$. At this point, the CORESET processing loop can begin.

For each CORESET, at block 1308, control processor 1140 can write CORESET-specific parameter values into control and status registers of pipeline 1110 by dispatching appropriate instructions to pipeline 1110. At block 1310, control processor 1140 can determine the number ($N_{CAN}$) of candidates in the CORESET. In some embodiments, the number of candidates for a 5G PDCCH CORESET can be determined based on the 5G PDCCH modulation and protocols. At block 1312, control processor 1140 can initialize a candidate iteration counter ($i_{CAN}$) for a candidate processing loop. In some embodiments, the candidate processing loop includes performing rate recovery for each of a number of interleaved sub-blocks (four sub-blocks in this example) and writing the sub-blocks, in de-interleaved order, into decoder input buffers 1116. After four sub-blocks have been written into decoder input buffers 1116, decoding of the candidate is performed. (In this example, it is assumed that the transmitter segmented the encoded DCI candidate block into four sub-blocks at the interleaving stage; where the transmitter has a different behavior, a different number of sub-blocks can be collected for a candidate.)

To implement the candidate processing loop, at block 1314, control processor 1140 can dispatch appropriate instructions to pipeline 1110 to write candidate-specific parameter values into control and status registers of processing engines 1121-1124. At block 1316, control processor 1140 can dispatch a LD-LLR instruction to pipeline 1110 to load the LLRs for a sub-block from L1 memory into CCE buffers 1114. The input address can be specified as the location in L1 memory where the LLRs are stored. The output virtual address can specify a location in CCE buffers 1114. In some embodiments, the output location is specified using one of virtual addresses VR0-VR15, and the location can be selected based on the candidate iteration counter such that consecutive LD-LLR instructions specify different locations, which can help to avoid instances where interlock controller 1130 delays execution of an instruction due to a virtual address conflict that is not related to data dependencies. When the LD-LLR instruction is executed, LLR data from L1 memory is loaded into the specified location in CCE buffers 1114.

At block 1318, control processor 1140 can dispatch a RATE-RECOVER instruction to pipeline 1110 to perform rate recovery on a sub-block. The input address of the RATE-RECOVER instruction can be the same as the output virtual address of the preceding LD-LLR instruction, and the output virtual address can specify a location in decoder input buffers 1116. In some embodiments, the output location is specified using one of virtual addresses VR16-VR23, and the location can be selected based on the candidate iteration counter such that consecutive RATE-RECOVER instructions specify different output locations, which can help to avoid instances where interlock controller 1130 delays execution of an instruction due to a virtual address conflict that is not related to data dependencies. The RATE-RECOVER instruction is executed in processing engine 1122, e.g., using functional units 1221-1223 in a sub-pipeline as described above. As described above, interlock controller 1130 can ensure that processing engine 1122 does not attempt to perform rate recovery for a particular sub-block until that sub-block has been loaded into the CCE buffer.

Accordingly, control processor 1140 need not wait for the LD-LLR instruction to finish loading a sub-block before dispatching the RATE-RECOVER instruction(s) for that sub-block. At block 1320, control processor 1140 can increment a counter (numCD) that tracks the number of sub-blocks awaiting decoding (which can be the same as the number of sub-blocks for which loading and rate recovery instructions have been dispatched). In some embodiments, the counter numCD is initialized to zero at the beginning of process 1300.

Figure 14:
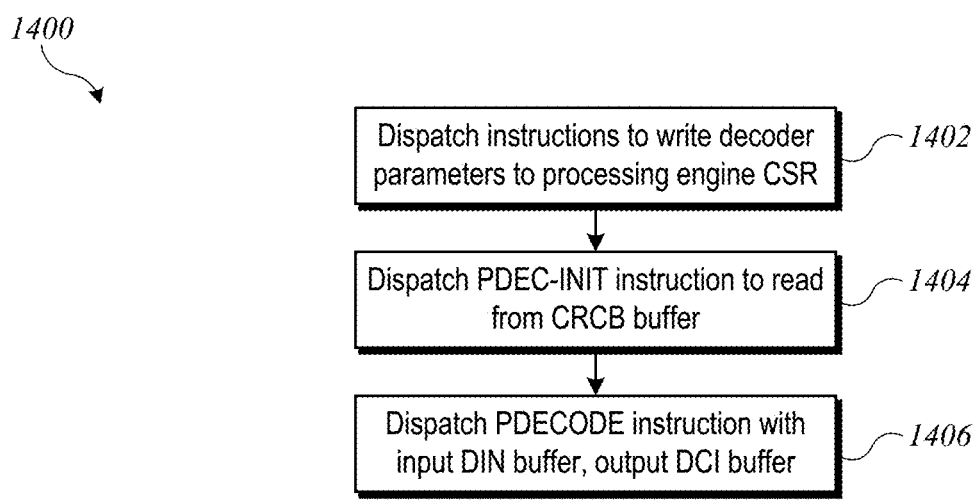
FIG. 14 shows a flow diagram of a process for dispatching decoding instructions according to some embodiments.

Referring to FIG. 13B, if, at block 1322, the counter numCD has reached four (or the appropriate number of sub-blocks for a candidate DCI block), then at block 1324, control processor 1140 can dispatch a decoding instruction to pipeline 1134. The decoding instruction can specify a location in decoder input buffer 1116 as the input virtual address and a location in DCI buffer 1118 as the output virtual address. In some embodiments, dispatching a decoding instruction can include dispatching multiple instructions in sequence. For example, FIG. 14 shows a flow diagram of a process 1400 that control processor 1140 can implement at block 1324 of process 1300 according to some embodiments. Process 1400 can apply to 5G PDCCH decoding; similar processes can be implemented for 4G PDCCH decoding or any other type of decoding supported by pipeline 1110. At block 1402, control processor 1140 can dispatch one or more instructions to pipeline 1110 to write candidate-specific parameters for the decoder into control and status registers of processing engine 1123. At block 1404, control processor 1140 can dispatch a PDEC-INIT instruction to pipeline 1100. The PDEC-INIT instruction can specify a location in CRCB buffers 1112 as an input virtual address. In some embodiments, the PDEC-INIT instruction is executed by functional unit 1235 to load an RNTI/CRC bitmap from the specified location into internal registers of processing engine 1123, and an output virtual address is not specified. Execution of the PDEC-INIT instruction can also include other operations, such as initializing internal registers of processing engine 1123 that are used by functional unit 1231 during decoding. At block 1406, control processor 1140 can dispatch a PDECODE instruction to pipeline 11100. The PDECODE instruction can specify a location in decoder input buffers 1116 as an input virtual address and a location in DCI buffers 1118 as an output virtual address. When the PDECODE instruction is executed by functional unit 1231, the candidate at the input location in decoder buffers 11116 can be decoded. As described above, interlock controller 1130 can ensure that processing engine 1123 does not attempt to decode a particular candidate until all sub-blocks for that candidate have been stored in decoder input buffers 1116. Accordingly, control processor 1140 need not wait until rate recovery is finished for all sub-blocks of a particular candidate before dispatching the PDECODE instruction for that candidate.

Referring again to FIG. 13B, after dispatching the decoding instruction(s) at block 1324, control processor 1140 can reset the sub-block counter numCD, e.g., to zero, at block 1326. At block 1328, control processor 1140 can increment a counter ($n_{DEC}$) that counts the number of pending decoder calls (i.e., decoding instructions that have been dispatched for which results have not been read out). In some embodiments, the counter $n_{DEC}$ counter is initialized to zero at the beginning of process 1300.

If, at block 1330, the counter $n_{DEC}$ has a value greater than 1, then at block 1332, control processor 1140 can dispatch a DCI_READ instruction to read a decoded candidate from DCI buffers 1118. The DCI_READ instruction can specify a location in DCI buffers 1118 as an input virtual address. In some embodiments, the DCI_READ instruction can provide the data to internal registers of control processor 1140, and an output virtual address can be unspecified. Control processor 1140 can decrement the counter $n_{DEC}$ of pending decoder calls at block 1134.

If, at block 1336, the candidate iteration counter $i_{CAN}$ has not reached the number of candidates $N_{CAN}$, then at block 1338, control processor 1140 can increment iteration counter $i_{CAN}$; process 1300 can then return to block 1314 (as indicated by node B) to process the next candidate. Once all candidates have been processed (node C), the candidate processing loop is completed.

Referring now to FIG. 13C, after the candidate processing loop is completed (node C), process 1300 can determine whether any extra sub-blocks remain. As described above, in process 1300, a decoding instruction can be dispatched for each group of four sub-blocks. In some embodiments, the number of sub-blocks in a CORESET might not be a multiple of four, in which case some sub-blocks may remain at the end of the candidate processing loop. Accordingly, if, at block 1340, the sub-block counter (numCD) has a nonzero value, then at block 1342, control processor 1140 can dispatch a decoding instruction to pipeline 1134. As at block 1324, the decoding instruction can specify a location in decoder input buffer 1116 as the input virtual address and a location in DCI buffer 1118 as the output virtual address. In some embodiments, implementation of blocks 1324 and 1342 can be identical; for instance, if process 1400 is invoked at block 1324, then process 1400 can also be invoked at block 1342. At block 1344, control processor 1140 can increment the counter $n_{DEC}$ of pending decoder calls. At block 1346, control processor 1140 can dispatch a DCI_READ instruction to read a decoded candidate from DCI buffers 1118, similarly to block 1332. At block 1348, control processor 1140 can decrement the counter $n_{DEC}$ of pending decoder calls.

At block 1350, control processor 1140 can dispatch one or more additional DCI_READ instructions to read any remaining decoded DCI candidates from decoder output buffers 1118.

If, at block 1352, the CORESET iteration counter $i_{CO}$ has not reached its ending value ($N_{CO}$), then at block 1354, control processor 1140 can increment CORESET iteration counter $i_{CO}$, and process 1300 can return to block 1308 (as indicated by node D) to process another CORESET. Once all CORESETs have been processed, at block 1356, control processor 1140 can perform additional post-loop processing (block 1356) as desired.

It should be understood that processes 1300 and 1400 are illustrative and that variations and modifications are possible. In some embodiments, a process similar to process 1300 can be implemented to support 4G PDCCH decoding using the same pipeline 1100 and control processor 1140. For instance, PDECODE instructions executed by polar decoder 1231 in processing engine 1123 can be replaced with CDECODE instructions executed by convolutional decoder 1232, and parameters loaded into the parameter registers of various processing engines 1121-1123 can be defined appropriately for 4G PDCCH. The number of sub-blocks collected for each candidate DCI block can be modified appropriately for 4G PDCCH. The same principle can be extended to other operating modes (e.g., modes corresponding to different communication standards), and PDCCH decoding for a variety of operating modes can be supported by providing appropriate functional units in pipeline 1110, at least in instances where the PDCCH encoding for all supported modes follows the same general sequence of operations. (Using the same pipeline hardware to support decoding for very different encoding/decoding sequences might not provide a net benefit, but such implementations are not precluded.)

Flow control in pipeline 1110 during processes 1300 and 1400 will now be described. As each instruction is dispatched to pipeline 1110 and routed to one of processing engines 1121-1124, the dispatch queue interface in the processing engine that receives the instruction can issue a read-lock for the input virtual address and a write-lock for the output virtual address to interlock controller 1130. For instance, the first data-flow instruction dispatched to pipeline 1110 for a particular candidate during process 1300 can be a LD-LLR instruction specifying an output virtual address VR0, where VR0 is a virtual address in CCE buffers 1114. Upon receipt of the LD-LLR instruction, the dispatch queue interface of processing engine 1121 can issue a write-lock for virtual address VR0 to interlock controller 1130. Processing engine 1121 can begin polling interlock controller 1130 with virtual address VR0 and can issue the LD-LLR instruction to functional unit 1212 once interlock controller 1130 returns "Grant." The second data-flow instruction dispatched to pipeline 1110 for the same candidate can be a RATE-RECOVER instruction specifying virtual address VR0 as the input virtual address. Upon receipt of the RATE-RECOVER instruction, the dispatch queue interface of processing engine 1122 can issue a read-lock for virtual address VR0 to interlock controller 1130. Processing engine 1122 can initiate operation of the rate-recovery sub-pipeline (e.g., functional units 1221-1223) after interlock controller 1130 returns "Grant" for writing to VR0. In this manner, data flow within a thread can be managed. In some embodiments, different sub-blocks of the same candidate can be assigned to different virtual addresses in CCE buffers 1114 and decoder input buffer 1116. For example, if the first sub-block of a candidate is loaded into virtual address VR0 and the second sub-block is loaded into virtual address VR1, processing engine 1121 can load the second sub-block without waiting for processing engine 1122 to clear the read-lock for virtual address VR0. In the case of the PDECODE instruction, which can operate on multiple sub-blocks, the input virtual address range can include all of the sub-blocks. Upon receipt of the PDECODE instruction processing engine 1123 can issue a read-lock for the input virtual address range. For example, the RATE-RECOVER instructions for the sub-blocks of a candidate can specify different virtual addresses within decoder input buffers 1116 (e.g., VR16, VR17, VR18, VR19 for four sub-blocks). The PDECODE instruction can specify an input virtual address range covering all of the sub-blocks (e.g., VR16-VR19). As long as interlock controller 1130 does not return "Grant" to processing engine 1123 until preceding write-locks for the entire input virtual address range have been cleared, the PDECODE instruction will execute only when its input data is ready.

It should be understood that where different instructions specify virtual addresses that map to different, non-overlapping physical locations, each processing engine can operate independently, executing its own instructions (in order) regardless of what other processing engines may be doing. Where different instructions specify the same virtual address (or overlapping virtual address ranges), interlock controller 1130 enforces the data dependencies. Accordingly, in some embodiments the same sequence of operations (e.g., load, rate-recover, decode, read DCI) can be performed for different candidates concurrently. For instance, different processing engines can operate concurrently on different candidates (whose data is stored in different physical buffers), while the correct sequence of operations for each candidate is performed. Stated differently, pipeline 1110 can provide a multithreaded processing pipeline in which each candidate is processed in a different thread and multiple threads can be executing concurrently.

For example, process 1300 shows dispatching a sequence of instructions to process each candidate for 5G PDCCH. In some embodiments, dispatch of instructions for other threads can be interleaved with the operations shown in process 1300. For example, decoding of a candidate can take longer than the load and rate recovery operations. In some embodiments, after dispatching the decode instruction (e.g., process 1400) for one thread, process 1300 can dispatch load and rate recovery instructions for another thread before dispatching a read instruction to read the decoder output for the first thread. Further, in some embodiments the decoder functional unit can be multithreaded (e.g., as described in above-referenced and U.S. patent application Ser. No. 17/484,982). As long as the virtual address space is defined such that different virtual addresses map to different physical locations, and as long as instructions for different threads use non-overlapping virtual addresses, any number of threads can coexist in pipeline 1100.

As this example illustrates, by tracking the read-locks and write-locks from the processing engines 1121-1124 in pipeline 1110, and by granting or denying poll requests from processing engines 1121-1124 in pipeline 1110 based on the absence or presence of earlier read-locks and/or write-locks (e.g., as described above with reference to FIG. 10), interlock controller 1130 can enforce in-order execution of operations within a thread while allowing other threads to execute independently as long as no buffer-access conflicts arise between threads. Buffer-access conflicts between threads can be managed by interlock controller 1130 using exactly the same logic that manages data dependencies within threads: instructions, regardless of thread, are granted access to a particular buffer only after any previous read-locks and/or write-locks have been cleared, regardless of what thread a particular instruction may be associated with. Thus, interlock controller 1130 can enforce correct behavior within or among threads while remaining agnostic as to how many processing engines (or functional units) are present in pipeline 1100, how many thread are being executed, what operations are being performed in each thread, or how long a given operation may take.

For each thread, the sequence of processing operations is defined by the sequence of dispatched instructions (with virtual addresses used to manage data dependencies), and the sequence of dispatched instructions can be different for different threads. In some embodiments, different concurrent threads can be executing different instruction sequences. For instance, a cellular modem processor may switch between different operating modes (e.g., 4G and 5G) as network conditions change, which can happen frequently in a mobile device. In some embodiments, different concurrent threads can include threads processing PDCCH candidates for different operating modes, and there is no need to flush pipeline 1110 when switching between operating modes. This can help to support high throughput in a multimode environment.

It should also be noted that control processor 1140 can be agnostic to the operation of interlock controller 1130. For instance, the program code executed by control processor 1140 (e.g., implementing process 1300) does not need to include any instructions regarding read-locks, write-locks, or polling; these operations are performed for every received instruction by hardware in pipeline 1110. In some embodiments, the instructions dispatched by control processor 1140 can identify input and output buffers using the same virtual addresses used by interlock controller 1130. Alternatively, instructions dispatched by control processor 1140 can use a different addressing scheme (e.g., physical addresses or a buffer index or the like), and processing engines 1121-1124 can translate the addresses in the dispatched instructions to virtual addresses for communication with interlock controller 1130. Regardless of the particular addressing scheme, as long as input and output addresses for each instruction are specified such that different addresses correspond to different physical data-storage locations and to different virtual addresses in the virtual address space used by interlock controller 1130, the desired behavior is automatically produced by the hardware in the pipeline. In addition, control processor 1140 does not need to determine whether a particular instruction is ready to execute. Control processor 1140 can simply dispatch instructions sequentially to pipeline 1110, and the hardware in pipeline 1110 can manage the execution in the manner described above. If one or more dispatch queues in pipeline 1110 fills to capacity, backpressure can be used to pause instruction dispatch by control processor 1140 until space becomes available in the relevant dispatch queue. Control processor 1140 can also be agnostic to how the various functional units that execute instructions are assigned to processing engines; routing logic within pipeline 1110 can direct each dispatched instruction to the correct processing engine.

Control processor 1140 can also dispatch instructions for different threads in any relative order. For instance, control processor 1140 can issue one instruction for each of some number (e.g., 4) threads, then issue a next instruction for each thread. Other schemes for interleaving dispatch of instructions for different threads can be implemented, as long as the order of instructions within each thread is maintained. In some embodiments, the order of instruction dispatch between threads can be tweaked to optimize throughput, latency, or other performance considerations. Where different threads use different parameter settings, control processor 1140 can dispatch instructions to update parameter registers for each thread. The parameter-update instructions can be queued in order with all other instructions in the dispatch queues of processing engines 1121-1124, and each processing engine can update its parameter registers (by executing the parameter-update instructions) after completing execution of any instructions that may be ahead of the parameter-update instructions. Accordingly, in some embodiments there is no need to flush the pipeline between threads, even when parameters change.

It should be understood that multiple pipelines, including one or more instances of pipeline 1110 can coexist in the same cellular modem processor. Each pipeline can have its own processing engines, its own buffers, its own interlock controller and virtual register file, and its own virtual address space. In some embodiments, the same control processor can dispatch instructions to multiple pipelines. For example, a control processor can dispatch instructions to one pipeline to extract LLRs for candidate PDCCH data blocks from received signals, then dispatch instructions to PDCCH pipeline 1110 to decode the candidates. Alternatively, some or all of the pipelines can have their own dedicated control processor (which may allow more pipelines to operate in parallel). In the case of a sub-pipeline within a processing engine, the control processor can be implemented within the processing engine, and the dispatching of instructions can be driven by either hardware or firmware, depending on implementation. In each pipeline, data synchronization can be provided using a combination of firmware-based control (e.g., via control processor 340, 1140) and hardware-based dependency management (e.g., via interlock controller 330, 1130) as described herein Those skilled in the art with access to the present disclosure will appreciate that pipeline data synchronization using a combination of firmware-based control and hardware-based dependency management as described herein can provide various advantages over other approaches to flow-control or data synchronization.

For example, to implement purely hardware-based flow control, a system designer models each processing engine as a state machine, and possible state sequences depend on the possible pairs of processing engines (or functional units) that may operate successively on the same data block and how long each operation might take. In a pipeline with several processing engines, each having several possible states, the number of combination of states can become large, making it difficult to verify correct operation of the pipeline under all possible conditions. For firmware-based flow control, the hardware state machine can be simplified, but the firmware developer needs to consider the possible states and sequences of states and incorporate exceptions and event handling into the program code.

In contrast, in various embodiments described herein, each processing engine operates according to a simple state machine: if all data dependencies for the next instruction are satisfied, proceed; if not, wait. The same state machine applies to each processing engine (or functional unit) in the pipeline. The simplicity of the state machines can simplify validation of the hardware. Likewise, the firmware developer does not have to wrestle with a complex state machine; a firmware developer can simply write program code expressing the intended data flow. For instance, to cause processing engine 323 to operate on data output from processing engine 322, the developer can code an instruction executable by processing engine 322 that writes to a given address followed by an instruction executable by processing engine 323 that reads from that address. The developer can write such code almost intuitively, without knowing details of the hardware (including which processing engines execute which instructions).

Some embodiments can also provide advantages of flexibility. For instance, adapting hardware-based flow control to changes in the processing algorithms can be difficult and often requires new circuitry. In contrast, in embodiments described herein, at least some changes to algorithms can be implemented simply by updating the firmware. For example, if a parameter of the PDCCH polar coding is changed, the firmware executed by control processor 1140 can be updated to provide the new parameter to functional unit 1231. The new parameter may change the amount of time required for functional unit 1231 to decode a candidate; however, the same simple state machine can still apply, with interlock controller 1130 assuring that downthread instructions will wait until functional unit 1231 has finished the decoding operation.

In addition, some embodiments described herein provide a unified (or generic) data synchronization architecture. The interlock controller design and operation is not specific to any particular processing engines or functional units, or to any particular combination of processing engines and functional units. The interlock controller can be agnostic as to how the virtual address space maps to physical memory (e.g., buffers as described above); instead, the virtual addresses are used simply as indicators of data dependencies. Further, the decision logic in the interlock controller can operate independently of any particular functionality of any processing engine (e.g., which functional units are in a particular processing engine) or pipeline. Data dependencies are defined based on the order of instruction dispatch and on the input and output address information specified for each instruction, and the same decision logic to determine whether data dependencies have been satisfied can apply without regard to of the amount of data, particular operations performed on the data, or where the data is physically stored. Consequently, there is no need to design an interlock controller separately for each pipeline. In some embodiments, an instance of the same interlock controller circuitry can be deployed for every instance of every pipeline in the processor, with the only difference between interlock controller instances being the number of processing engines from which the interlock controller receives requests. This can greatly simplify the implementation of flow-control in a processor that has multiple disparate pipelines, such as a cellular modem processor.

While specific embodiments have been described, those skilled in the art will appreciate that variations and modifications are possible. For instance, a cellular modem processor can include any number and combination of pipelines and can support any number of radio area networks, including 4G and/or 5G. Each pipeline can have its own control processor, or one control processor may be configured to dispatch instructions to multiple pipelines, as desired. A pipeline can include any number of processing engines, and the assignment of particular operations (or functional units) to processing engines can be modified as desired. The processing engines or functional units can be vector engines that perform the same operations in parallel on multiple inputs. Buffers between pipeline stages can be implemented using any type of memory circuit and can include any combination of dedicated buffers (with only one processing engine writing and only one processing engine reading) and shared buffers (where multiple processing engines may read and/or write). An interlock controller can use a variety of techniques to track data dependencies. The virtual address space used by the interlock controller can use a variety of addressing schemes, provided that different virtual addresses map to different physical buffer (or other memory) locations and virtual addresses can be defined at any desired level of granularity, e.g., a word, a row, a buffer, etc. Instructions dispatched to a pipeline can specify virtual addresses for the interlock controller either directly (e.g., the input and output virtual addresses can be operands of a dispatched instruction) or indirectly (e.g., operands of a dispatched instruction can include addresses in any address space that the dispatch queues in the processing engines can map to the virtual address space used by the interlock controller). Examples of processes implemented in firmware and particular firmware instructions provided herein are also illustrative. Where names are used for particular functional units or instructions, such names are for ease of description and are not intended to define or imply any particular ISA.

All processes described herein are illustrative and can be modified. Operations can be performed in a different order from that described, to the extent that logic permits; operations described above may be omitted or combined; and operations not expressly described above may be added.

Unless expressly indicated, the drawings are schematic in nature and not to scale. All numerical values presented herein are illustrative and not limiting. Reference to specific standards for cellular data communication (e.g., 4G LTE or 5G NR) are also for purposes of illustration; those skilled in the art with access to the present disclosure will be able to adapt the devices and methods described herein for compatibility with other standards.

The present disclosure includes references to "an" "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise" or "can arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The word "can" is used herein in the same permissive sense (i.e., having the potential to, being able to).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set {w, x, y, z}, these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set {w, x, y, z}, thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, Applicant will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various embodiments may use computer program code to implement various features. Any such program code may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may include an internal storage medium of a compatible electronic device, which can be any electronic device having the capability of reading and executing the program code, and/or external storage media readable by the electronic device that can execute the code. In some instances, program code can be supplied to the electronic device via Internet download or other transmission paths.

Numerous variations and modifications will become apparent to those skilled in the art once the above disclosure is fully appreciated. It is intended that the following claims be interpreted to embrace all such variations and modifications.

What is claimed is:

1. A processing system comprising:
a plurality of processing engines, wherein the processing engines include functional units configured to execute an instruction having an input virtual address and an output virtual address, the plurality of processing engines including a first processing engine having a first functional unit configured to execute a rate recovery instruction for a candidate data element and a second processing engine having a plurality of decoder functional units configured to execute a plurality of decode instructions to decode a candidate data element, wherein different ones of the plurality of decoder functional units are configured to execute different decode instructions from the plurality of decode instructions;
a plurality of buffers coupled to the plurality of processing engines, wherein different buffers in the plurality of buffers are mapped to a different virtual address in a virtual address space, the plurality of buffers including a decoder input buffer and a decoder output buffer;
a control processor coupled to the processing engines and configured to dispatch a sequence of instructions to the processing engines to decode a first candidate data element, wherein the sequence of instructions includes a rate recovery instruction having an output virtual address that maps to a first region in the decoder input buffer and a selected decode instruction selected from the plurality of decode instructions, the selected decode instruction having an input virtual address that maps to the first region in the decoder input buffer and an output virtual address that maps to a first region in the decoder output buffer; and
an interlock controller coupled to the plurality of processing engines and configured to manage data dependencies based on the input virtual addresses and the output virtual addresses of the instructions.

2. The processing system of claim 1 wherein the processing engines further include:
a respective dispatch queue configured to queue one or more instructions;
a respective dispatch queue interface configured to receive, in order, the dispatched instructions from the control processor, to queue the dispatched instructions in the dispatch queue for in-order execution, and to communicate a read-lock request for the input virtual address and a write-lock request for the output virtual address to the interlock controller; and
a respective instruction interface configured to communicate with the interlock controller to determine whether data dependencies for a next instruction queued in the dispatch queue are cleared, wherein the instruction interface initiates execution of the next instruction after the interlock controller indicates that the data dependencies are cleared.

3. The processing system of claim 1 wherein the plurality of decoder functional units includes a first decoder functional unit configured to perform polar decoding of a candidate data element in response to a polar-decode instruction and a second decoder functional unit configured to perform convolutional decoding of a candidate data element in response to a convolutional-decode instruction.

4. The processing system of claim 3 wherein the control processor is further configured such that:
when the candidate data element is from a transmission received via a 5G radio area network, the selected decode instruction is the polar-decode instruction; and
when the candidate data element is from a transmission received via a 4G radio area network, the selected decode instruction is the convolutional-decode instruction.

5. The processing system of claim 1 wherein the sequence of instructions further includes a read instruction having an input virtual address that maps to the first region in the decoder output buffer and an output address that maps to a region in a register file of the control processor, wherein the read instruction is dispatched subsequently to the selected decode instruction.

6. The processing system of claim 1 wherein the plurality of buffers further includes a control channel element buffer and the processing engines further include a third processing engine that includes a load functional unit configured to execute a load instruction having an output virtual address that maps to a location in the control channel element buffer.

7. The processing system of claim 6 wherein the sequence of instructions further includes the load instruction having an output virtual address that maps to a first location in the control channel element buffer and wherein the rate recovery instruction in the sequence of instructions has an input virtual address that maps to the first location in the control channel element buffer.

8. The processing system of claim 6 wherein the control processor is configured to issue, for each of a plurality of sub-blocks corresponding to a candidate data element:
the load instruction, wherein the output virtual address of the load instruction is a sub-block-dependent virtual address; followed by
the rate recovery instruction, wherein for each of the plurality of sub-blocks, the input virtual address of the rate recovery instruction matches the output virtual address of the load instruction and the output virtual address of the rate recovery instruction is a de-interleaved location for the sub-block within the first region in the decoder input buffer.

9. The processing system of claim 1 wherein the control processor is further configured such that a first instruction in the sequence of instructions is dispatched for a second candidate data element before a last instruction in the sequence of instructions for the first candidate data element is executed.

10. A cellular modem processor comprising:
a plurality of processing pipelines including a first processing pipeline, wherein the first processing pipeline includes:
a plurality of processing engines, wherein the processing engines include functional units configured to execute an instruction having an input virtual address and an output virtual address, the plurality of processing engines including a first processing engine having a first functional unit configured to execute a rate recovery instruction for a candidate data element and a second processing engine having a plurality of decoder functional units configured to execute a plurality of decode instructions to decode a candidate data element, wherein different ones of the plurality of decoder functional units are configured to execute different decode instructions from the plurality of decode instructions;
a plurality of buffers coupled to the plurality of processing engines, wherein different buffers in the plurality of buffers are mapped to a different virtual address in a virtual address space, the plurality of buffers including a decoder input buffer and a decoder output buffer;
a control processor coupled to the processing engines and configured to dispatch a sequence of instructions to the processing engines to decode a first candidate data element, wherein the sequence of instructions includes a rate recovery instruction having an output virtual address that maps to a first region in the decoder input buffer and a selected decode instruction selected from the plurality of decode instructions, the selected decode instruction having an input virtual address that maps to the first region in the decoder input buffer and an output virtual address that maps to a first region in the decoder output buffer; and
an interlock controller coupled to the plurality of processing engines and configured to manage data dependencies based on the input virtual addresses and the output virtual addresses of the instructions.

11. The cellular modem processor of claim 10 wherein the first processing pipeline is configured to decode physical downlink control channel (PDCCH) data received via a 5G radio area network and to decode PDCCH data received via a 4G radio area network.

12. The cellular modem processor of claim 11 wherein and the plurality of processing pipelines further includes a second processing pipeline configured to decode physical downlink shared channel (PDSCH) data received via the 5G radio area network and a third processing pipeline configured to decode PDSCH data received via the 4G radio area network.

13. The cellular modem processor of claim 11 wherein the plurality of decoder functional units includes a first decoder functional unit configured to perform polar decoding of a candidate data element in response to a polar-decode instruction and a second decoder functional unit configured to perform convolutional decoding of a candidate data element in response to a convolutional-decode instruction.

14. The cellular modem processor of claim 13 wherein the control processor is further configured such that:
when the candidate data element is from a transmission received via the 5G radio area network, the selected decode instruction is the polar-decode instruction; and
when the candidate data element is from a transmission received via the 4G radio area network, the selected decode instruction is the convolutional-decode instruction.

15. The cellular modem processor of claim 10 further comprising:
a shared memory coupled to at least two of the processing pipelines, including the first processing pipeline.

16. A method comprising:
receiving, at a cellular modem processor having a decoding pipeline and a control processor, a plurality of candidate data elements;
dispatching, by the control processor, a sequence of instructions to the decoding pipeline to decode the plurality of candidate data elements, wherein the sequence of instructions for one of the candidate data elements includes a rate recovery instruction having an output virtual address that maps to a first region in a decoder input buffer of the decoding pipeline and a selected decode instruction selected from a plurality of decode instructions, the selected decode instruction having an input virtual address that maps to the first region in the decoder input buffer and an output virtual address that maps to a first region in a decoder output buffer of the decoding pipeline;
receiving the dispatched instructions in respective dispatch queues in a plurality of processing engines in the decoding pipeline, wherein the processing engine in which a particular dispatched instruction is received includes a functional unit configured to execute the particular dispatched instruction;
sending, by the processing engines, in response to receiving an instruction, a read-lock request for the input virtual address and a write-lock request for the output virtual address to an interlock controller of the decoding pipeline;

issuing, from the dispatch queues, the dispatched instructions to the functional units configured to execute the instructions, wherein instructions in a same one of the dispatch queues are issued in order and wherein a next instruction is issued from a particular dispatch queue only after the interlock controller confirms, based on the input virtual address and the output virtual address, that data dependencies for the next instruction have been cleared; and executing issued instructions by the functional units, wherein executing an issued instruction includes one or both of reading from the buffer region mapped to the input virtual address or writing to the buffer region mapped to the output virtual address.

17. The method of claim 16 further comprising selecting the decode instruction from the plurality of decode instructions based on a particular radio area network associated with the plurality of candidate data elements.

18. The method of claim 17 wherein the plurality of decode instructions includes a polar-decode instruction and a convolutional-decode instruction and wherein:

when the candidate data element is from a transmission received via a 5G radio area network, the polar-decode instruction is selected; and when the candidate data element is from a transmission received via a 4G radio area network, the convolutional-decode instruction is selected.

19. The method of claim 16 further comprising:

dispatching a first instruction in the sequence of instructions for a second one of the candidate data elements before a last instruction in the sequence of instructions for a first one of the candidate data elements is executed.

20. The method of claim 16 wherein the sequence of instructions for the one of the candidate data elements further includes:

a load instruction to read data for the candidate data element from an externally-shared memory, the load instruction having an output virtual address that corresponds to an input virtual address of the rate recovery instruction for the candidate data element, wherein the load instruction for the candidate data element precedes the rate-recovery instruction for the candidate data element in the sequence; and a read instruction to read decoded data for the candidate data element into a register file of the control processor, the read instruction for the candidate data element having an input virtual address that corresponds to the output virtual address of the selected decode instruction for the candidate data element, wherein the read instruction for the candidate data element is subsequent to the decode instruction for the candidate data element in the sequence.

* * * * *